US012341791B1

(12) United States Patent
DePalo et al.

(10) Patent No.: US 12,341,791 B1
(45) Date of Patent: Jun. 24, 2025

(54) MACHINE LEARNING TECHNIQUES FOR PREDICTIVE ANOMALY DETECTION

(71) Applicant: Liberty Mutual Insurance Company, Boston, MA (US)

(72) Inventors: Tran DePalo, Dover, NH (US); Jacob Miller, Newburgh, IN (US); Gary Bergeron, Dover, NH (US); Cristiano Costa, Manchester, NH (US)

(73) Assignee: Liberty Mutual Insurance Company, Boston, MA (US)

( * ) Notice: Subject to any disclaimer, the term of this patent is extended or adjusted under 35 U.S.C. 154(b) by 286 days.

(21) Appl. No.: 17/823,703

(22) Filed: Aug. 31, 2022

Related U.S. Application Data

(60) Provisional application No. 63/248,816, filed on Sep. 27, 2021.

(51) Int. Cl.
  *G06F 11/00* (2006.01)
  *G06F 11/34* (2006.01)
  (Continued)

(52) U.S. Cl.
  CPC ...... *H04L 63/1425* (2013.01); *G06F 11/3419* (2013.01); *G06F 11/3452* (2013.01); *G06F 11/3466* (2013.01); *H04L 41/16* (2013.01)

(58) Field of Classification Search
  CPC ............. G06F 11/3419; G06F 11/3452; G06F 11/3466
  See application file for complete search history.

(56) References Cited

U.S. PATENT DOCUMENTS 7,424,619 B1 * 9/2008 Fan .................. G06F 21/552
                                                713/188
9,652,354 B2   5/2017 Filimonov et al.
(Continued)

FOREIGN PATENT DOCUMENTS

WO    2021/142475 A1    7/2021

OTHER PUBLICATIONS

Lane, Terran et al. "An Application of Machine Learning to Anomaly Detection," In Proceedings of the 20th National Information Systems Security Conference, vol. 377, (13 pages), Feb. 14, 1997.
(Continued)

*Primary Examiner* — Amine Riad
(74) *Attorney, Agent, or Firm* — ALSTON & BIRD LLP

(57) ABSTRACT

As described herein, various embodiments of the present invention improve computational efficiency of performing reliable persistent monitoring of a computer system. Persistent monitoring of the operations of a computer system has various operational reliability benefits for various computer systems and is an important part of service level objectives for highly maintenance-critical computer systems. However, doing the noted persistent monitoring operations in a reliable manner requires access to large amounts of labeled training data that are not always available for more customized computer systems with unique operational/behaviorial pattern signatures. In response, various embodiments of the present invention address the noted challenges by generating training data for an anomalous operational state detection machine learning model whose training data may be generated using a ground-truth validation criterion that is defined based at least in part on an inferred outlier score for a decomposed residual component of a given operational monitoring timeseries trend.

20 Claims, 10 Drawing Sheets

(51) Int. Cl.
*H04L 9/40* (2022.01)
*H04L 41/16* (2022.01)

(56) References Cited

U.S. PATENT DOCUMENTS

| | | | |
|---|---|---|---|
| 10,270,788 B2 | 4/2019 | Faigon et al. | |
| 10,375,098 B2 | 8/2019 | Oliner et al. | |
| 10,986,110 B2 | 4/2021 | Dodson et al. | |
| 11,019,088 B2 | 5/2021 | Pratt et al. | |
| 11,204,602 B2* | 12/2021 | Cheng | G06F 18/2413 |
| 2005/0283511 A1* | 12/2005 | Fan | G06F 11/008 |
| | | | 708/321 |
| 2014/0279779 A1* | 9/2014 | Zou | G06N 3/049 |
| | | | 706/25 |
| 2018/0129975 A1* | 5/2018 | Razin | G06N 20/00 |
| 2019/0068627 A1 | 2/2019 | Thampy | |
| 2020/0285997 A1 | 9/2020 | Bhattacharyya et al. | |
| 2020/0293653 A1 | 9/2020 | Huang et al. | |
| 2020/0329066 A1 | 10/2020 | Kirti et al. | |
| 2020/0358800 A1 | 11/2020 | Bisht et al. | |
| 2020/0364561 A1 | 11/2020 | Ananthanarayanan et al. | |
| 2021/0116904 A1 | 4/2021 | Schuster et al. | |
| 2021/0256797 A1* | 8/2021 | Huke | G07F 17/323 |
| 2021/0302042 A1* | 9/2021 | Slimacek | F24F 11/38 |
| 2021/0344695 A1* | 11/2021 | Palani | G06N 3/043 |
| 2022/0321585 A1* | 10/2022 | Cobb | G06N 20/00 |
| 2022/0391754 A1* | 12/2022 | Guo | G06N 20/00 |
| 2023/0319083 A1* | 10/2023 | Torres Dho | G06N 20/10 |
| | | | 726/23 |

OTHER PUBLICATIONS

Liu, Dapeng et al. "Opprentice: Towards Practical and Automatic Anomaly Detection Through Machine Learning," In Proceedings of the 2015 Internet Measurement Conference, Oct. 28, 2015, (14 pages).

* cited by examiner

SUSPECTED ANOMALOUS PERIODS

August 4, 2022 AT 4:10:00 AM-August 4, 2022 AT 4:15:00 AM ET

SEE REPORT

August 4, 2022 AT 4:15:00 AM-August 4, 2022 AT 4:20:00 AM ET

SEE REPORT

August 4, 2022 AT 4:20:00 AM-August 4, 2022 AT 4:25:00 AM ET

SEE REPORT

MACHINE LEARNING TECHNIQUES FOR PREDICTIVE ANOMALY DETECTION

CROSS-REFERENCES TO RELATED APPLICATION(S)

The present application claims priority to U.S. Provisional Patent Application No. 63/248,816, filed on Sep. 27, 2021, which is incorporated herein in entirety.

BACKGROUND

Various embodiments of the present invention address technical challenges related to performing predictive monitoring and provide solutions to address the efficiency and reliability shortcomings of existing predictive monitoring solutions.

BRIEF SUMMARY

As described herein, various embodiments of the present invention introduce technical advantages related to detecting anomalous conditions of a monitored computer system. In doing so, the noted embodiments of the present invention improve the operational reliability and resilience of the monitored computer system by enabling detection anomalous behavior periods for the monitored computer system and proactively addressing those detection anomalous behavior periods by eliminating the inferred causes for the noted anomalous system behaviors.

In accordance with one aspect, a method is provided. In one embodiment, the method comprises: generating, using an initial anomaly designation machine learning model, and based at least in part on an input operational monitoring timeseries trend, an initial anomaly designation for the input operational monitoring timeseries trend; in response to determining that the initial anomaly designation for the input operational monitoring timeseries trend is a positive initial anomaly designation, generating, using an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and performing one or more prediction-based actions based at least in part on the inferred anomaly classification score.

In accordance with another aspect, an apparatus comprising at least one processor and at least one memory including computer program code is provided. In one embodiment, the at least one memory and the computer program code may be configured to, with the processor, cause the apparatus to: generate, using an initial anomaly designation machine learning model, and based at least in part on an input operational monitoring timeseries trend, an initial anomaly designation for the input operational monitoring timeseries trend; in response to determining that the initial anomaly designation for the input operational monitoring timeseries trend is a positive initial anomaly designation, generate, using an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and perform one or more prediction-based actions based at least in part on the inferred anomaly classification score.

In accordance with yet another aspect, a computer program product is provided. The computer program product may comprise at least one computer-readable storage medium having computer-readable program code portions stored therein, the computer-readable program code portions comprising executable portions configured to: generate, using an initial anomaly designation machine learning model, and based at least in part on an input operational monitoring timeseries trend, an initial anomaly designation for the input operational monitoring timeseries trend; in response to determining that the initial anomaly designation for the input operational monitoring timeseries trend is a positive initial anomaly designation, generate, using an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and perform one or more prediction-based actions based at least in part on the inferred anomaly classification score.

BRIEF DESCRIPTION OF THE DRAWINGS

Figure 1:
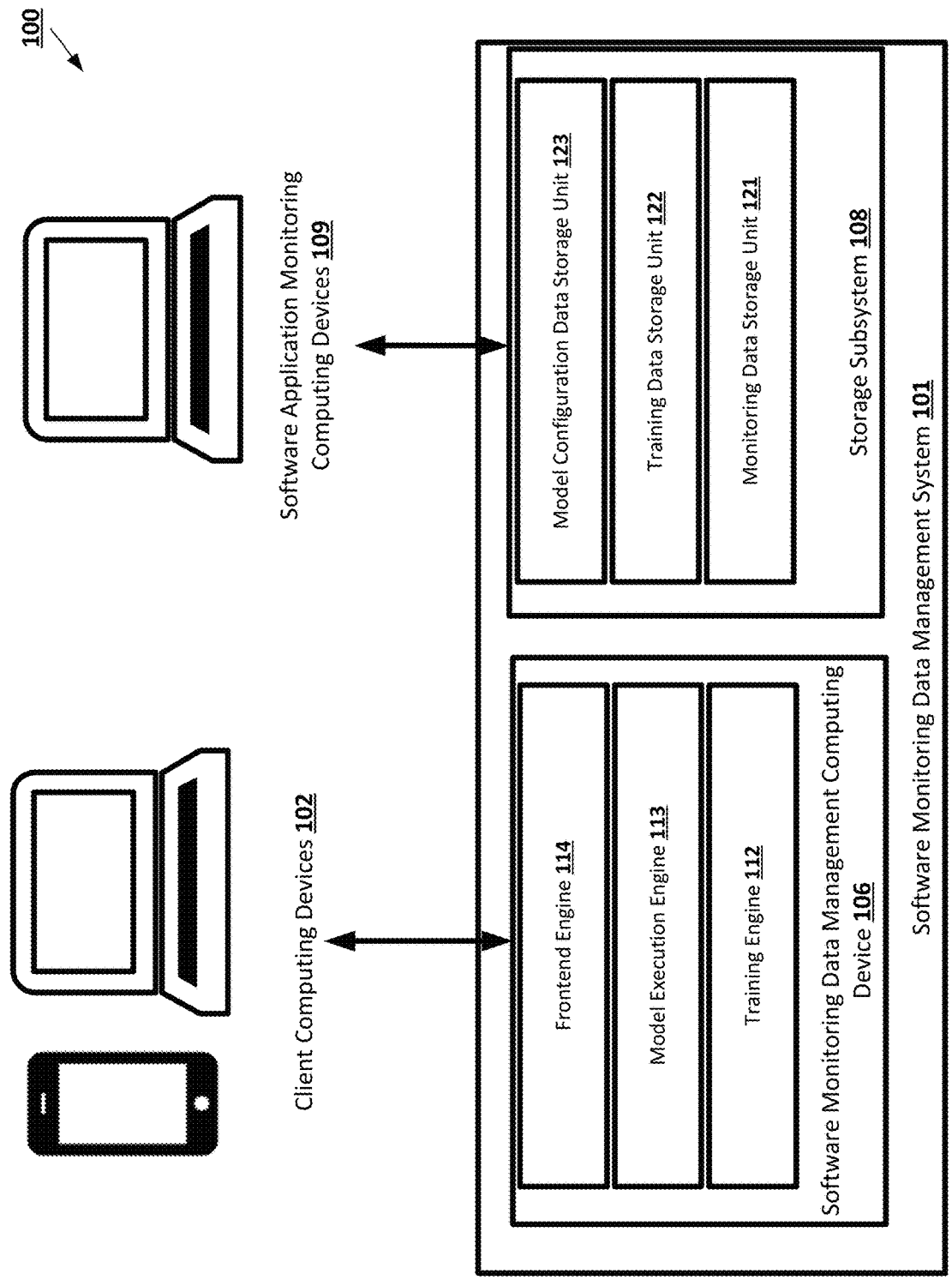

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
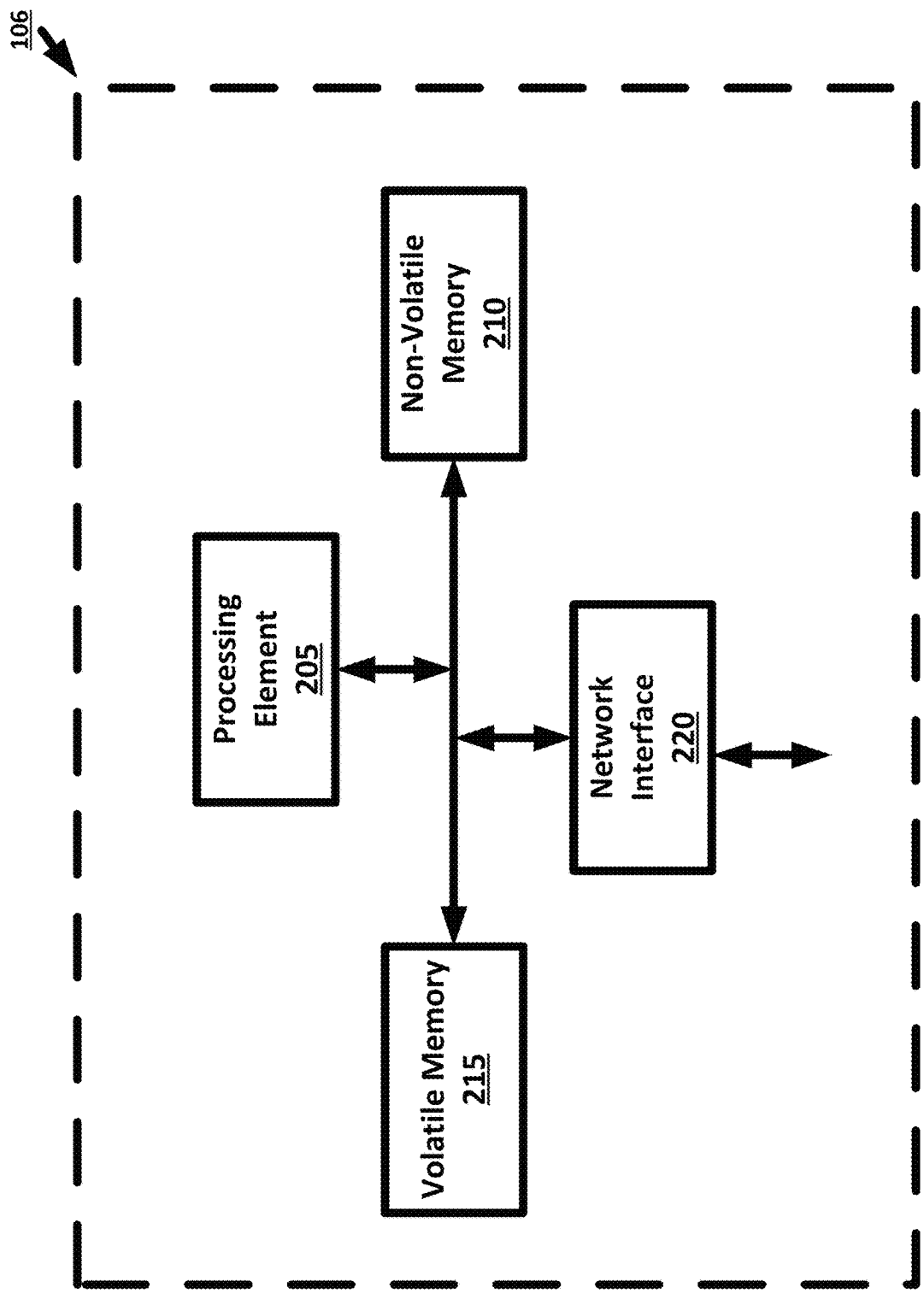

FIG. 2 provides an example predictive data analysis computing entity in accordance with some embodiments discussed herein.

Figure 3:
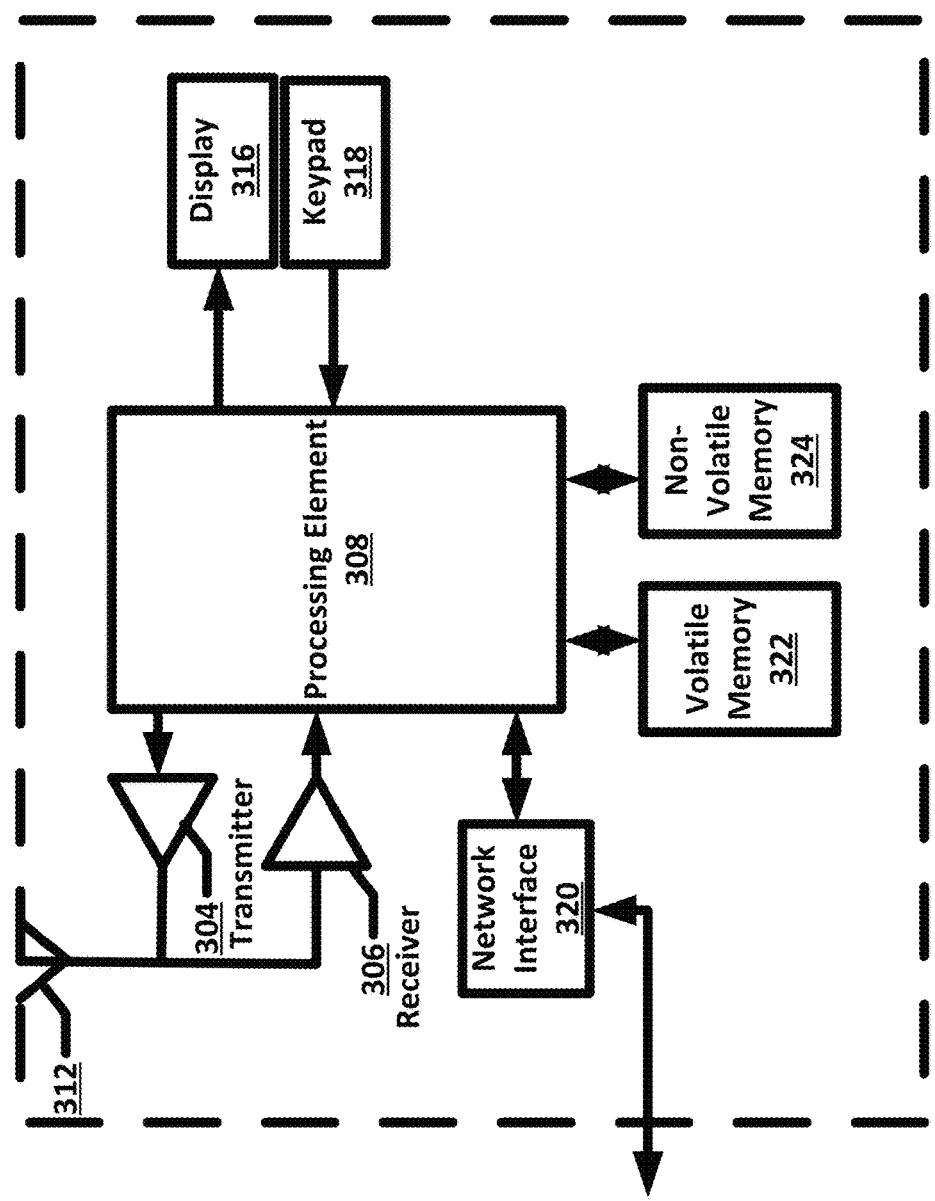

FIG. 3 provides an example client computing entity in accordance with some embodiments discussed herein.

Figure 4:
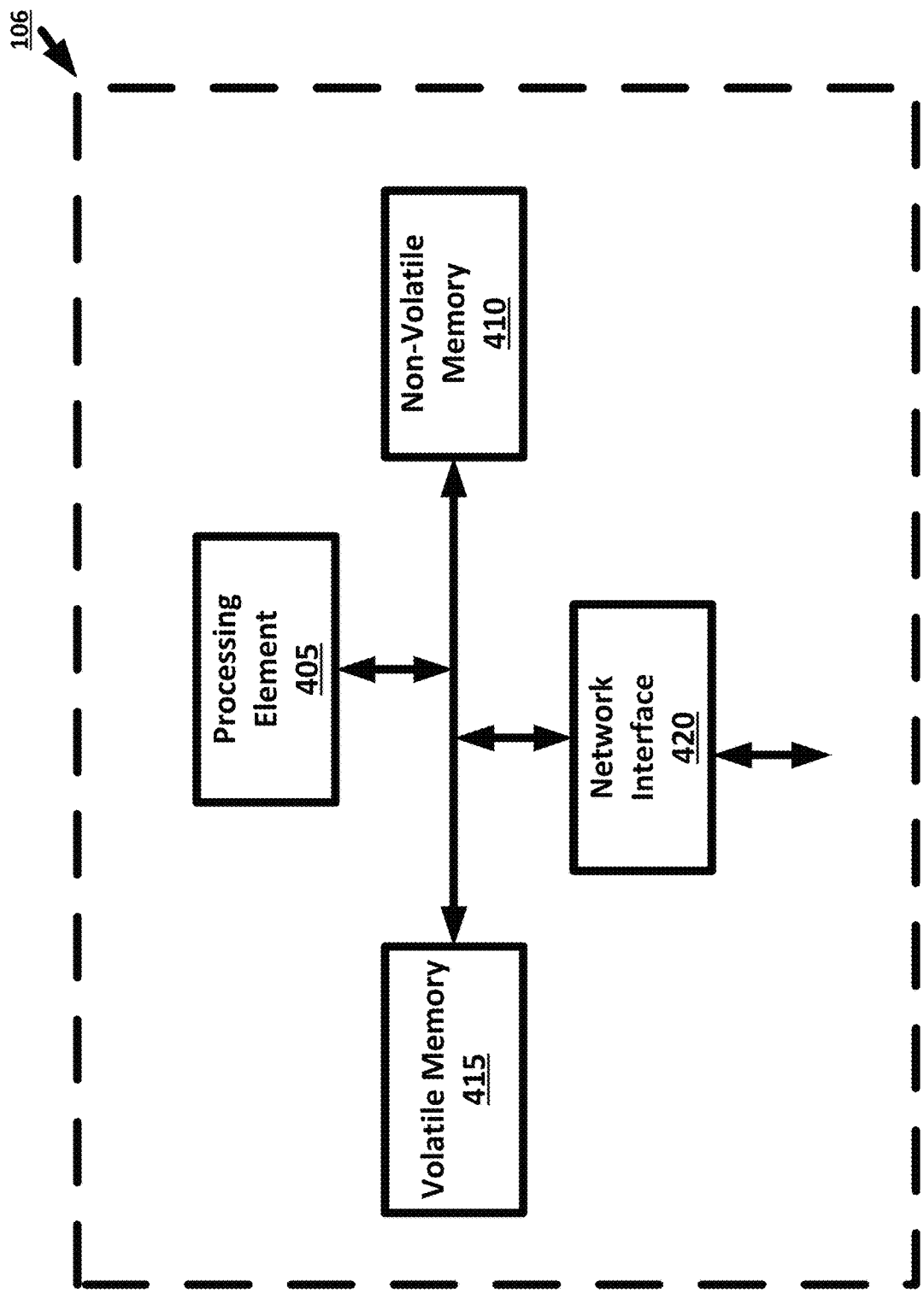

FIG. 4 provides an example system monitoring computing entity in accordance with some embodiments discussed herein.

Figure 5:
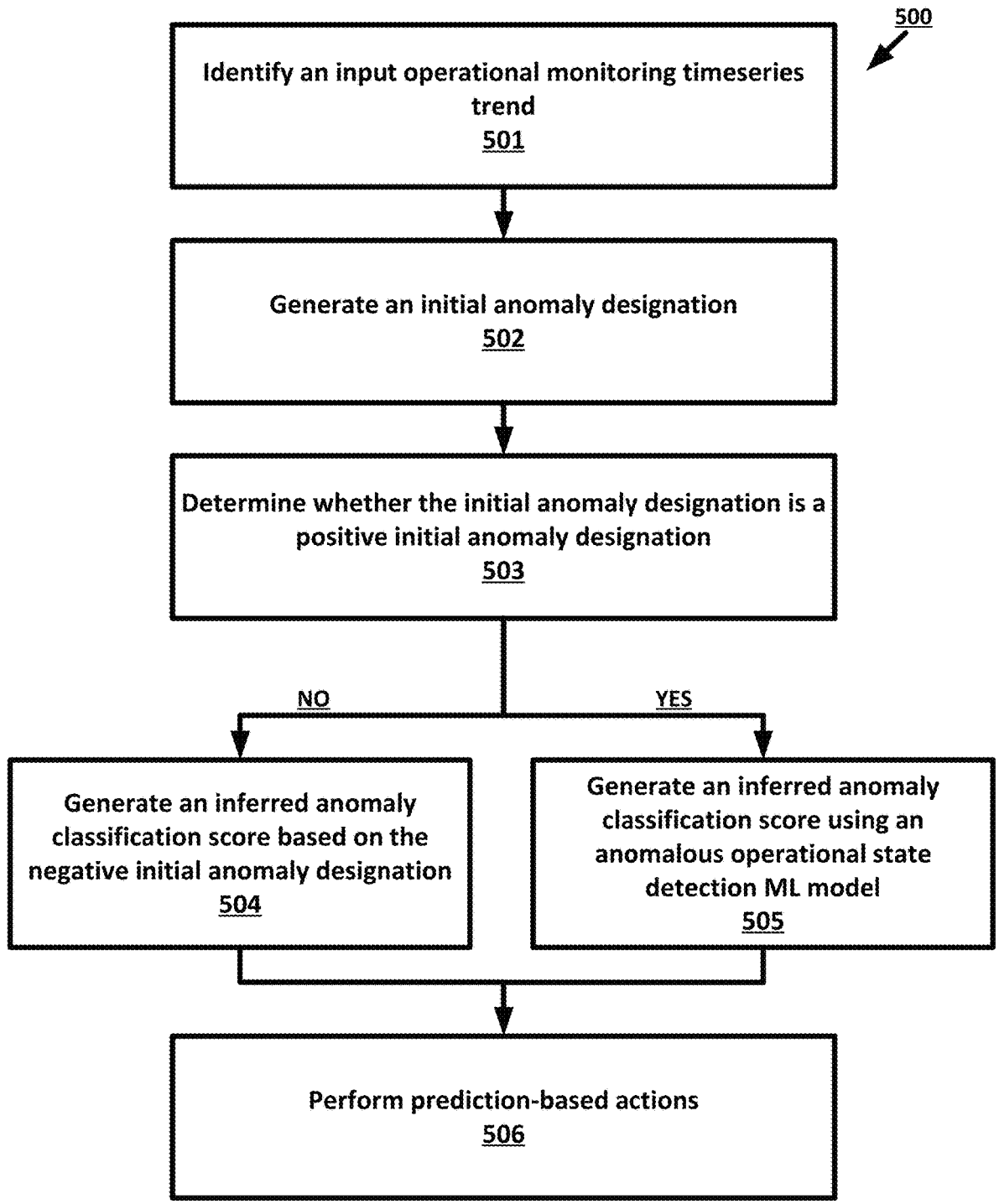

FIG. 5 is a flowchart diagram of an example process for generating an inferred anomaly classification score for an input operational monitoring timeseries trend in accordance with some embodiments discussed herein.

Figure 6:
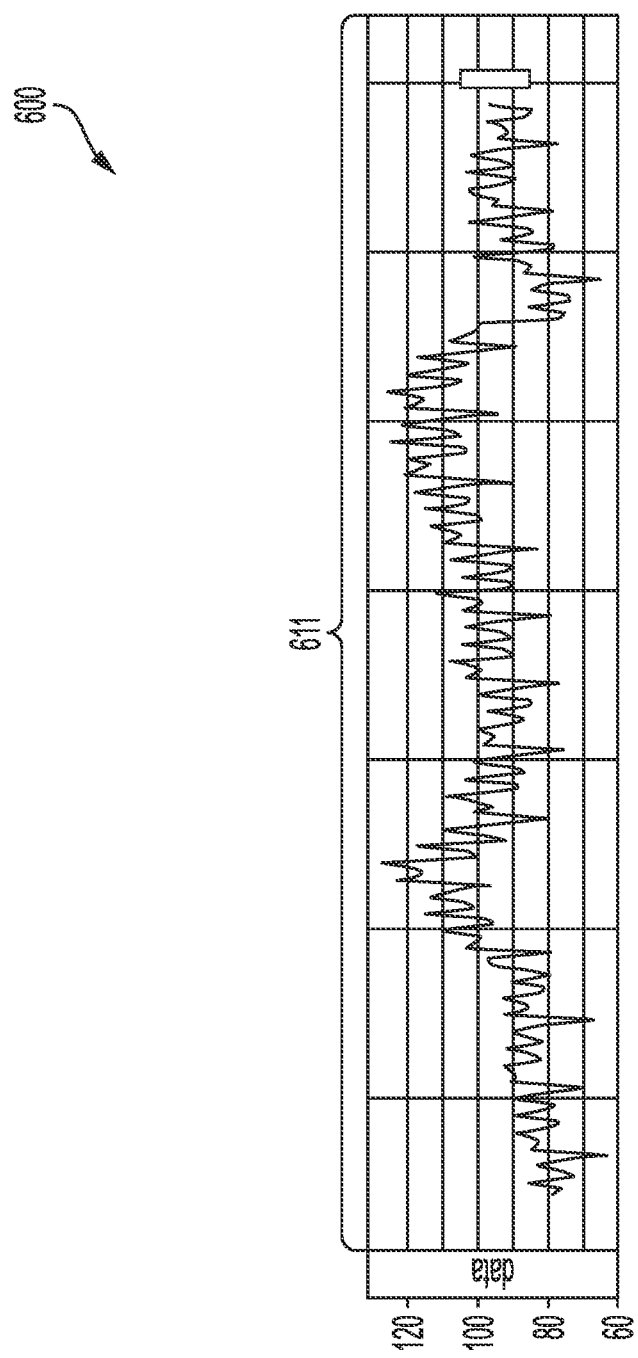

FIG. 6 provides an operational example of an operational monitoring timeseries trend in accordance with some embodiments discussed herein.

Figure 7:
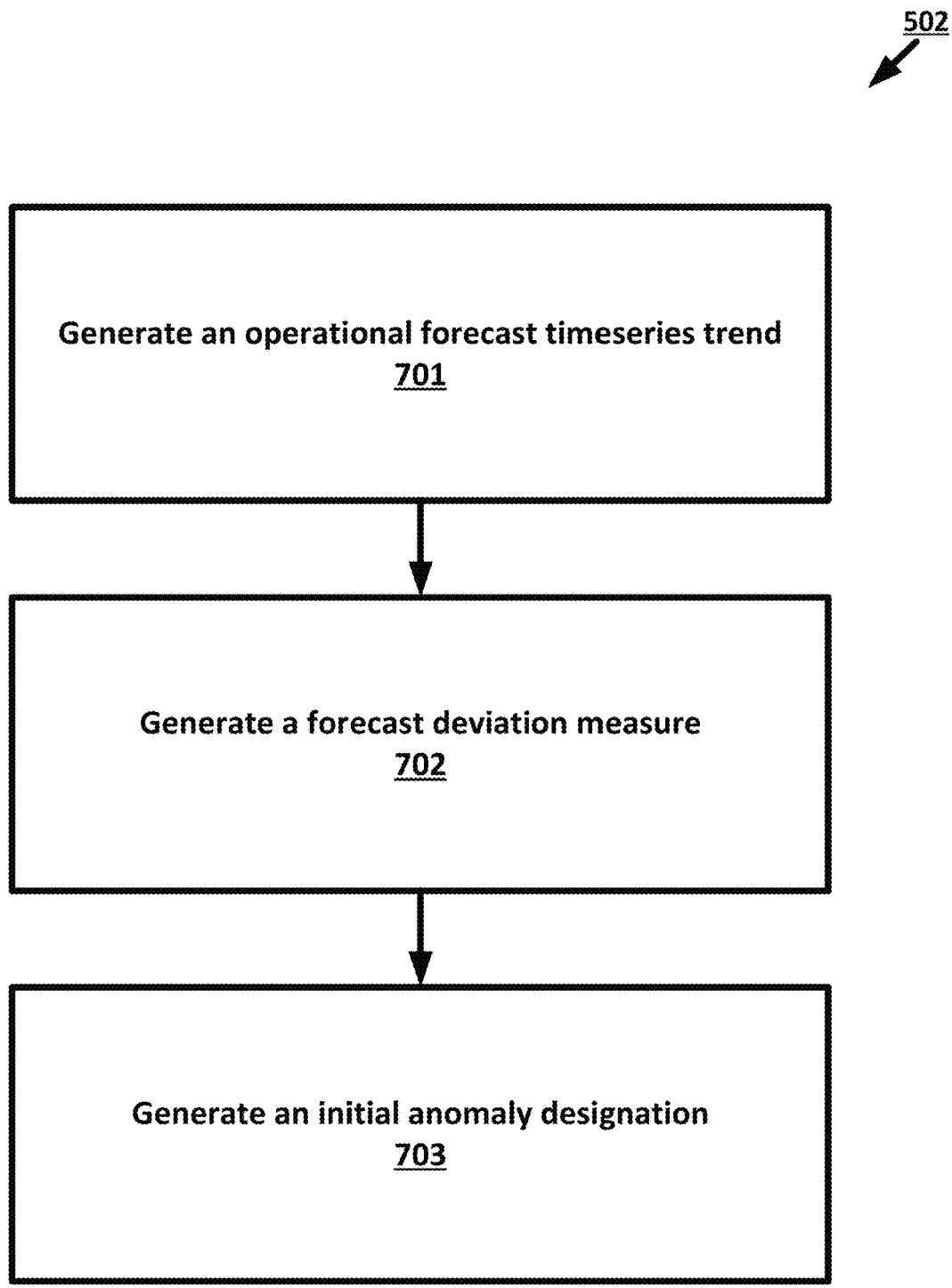

FIG. 7 is a flowchart diagram of an example process for generating an initial anomaly designation for an input operational monitoring timeseries trend using an initial anomaly designation machine learning model in accordance with some embodiments discussed herein.

Figure 8:
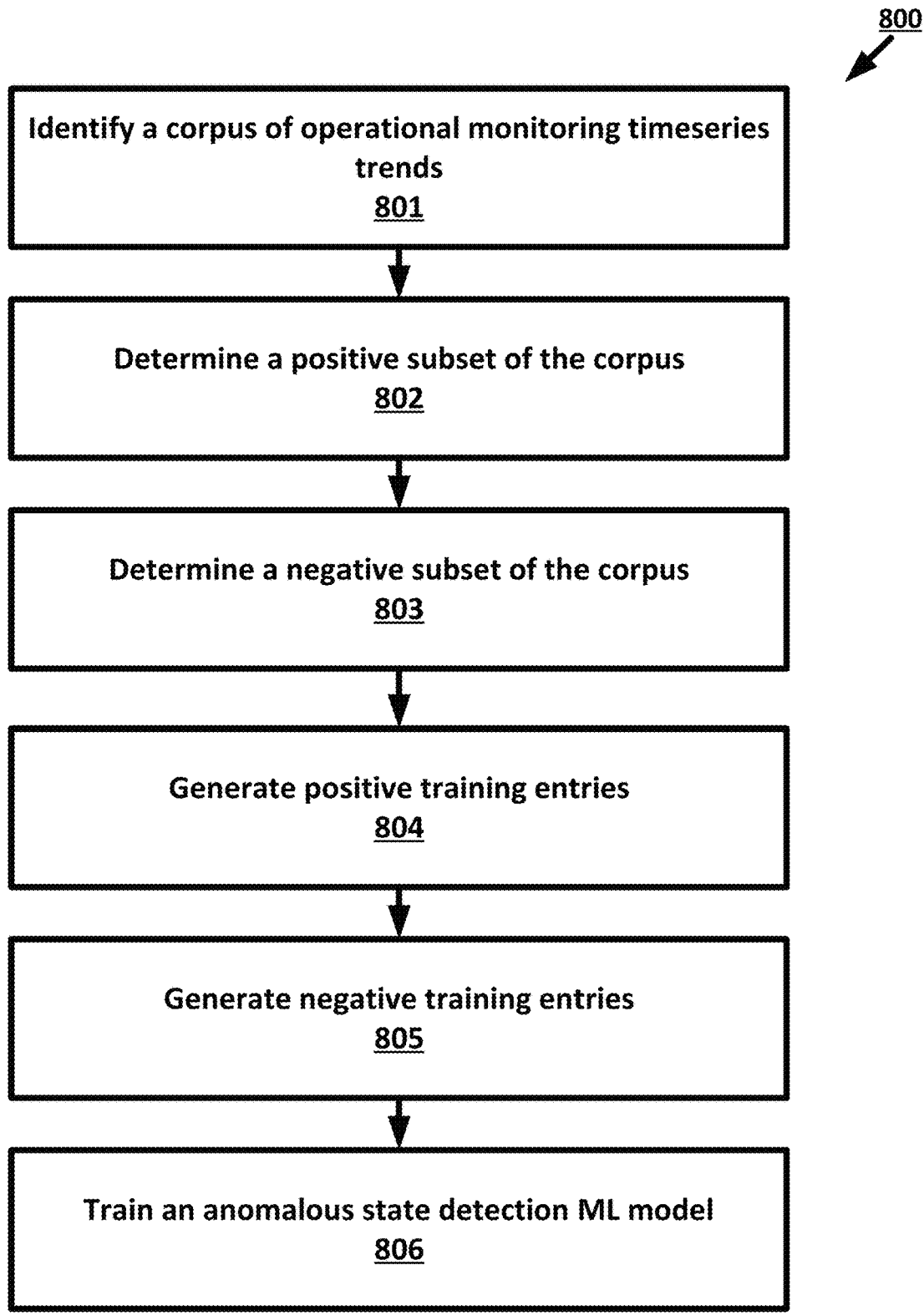

FIG. 8 is a flowchart diagram of an example process for training/generating an anomalous operational state detection machine learning model in accordance with some embodiments discussed herein.

Figure 9:
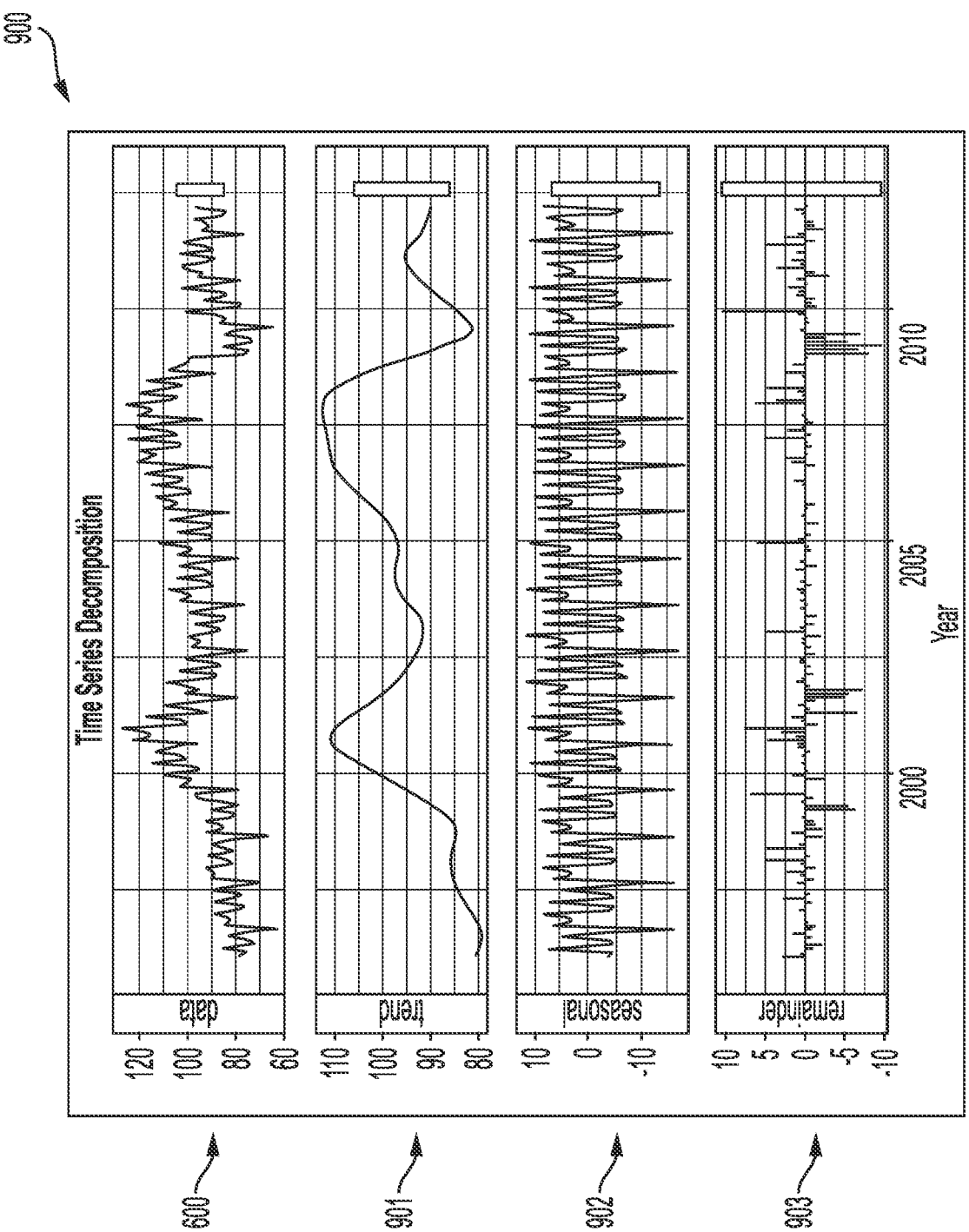

FIG. 9 provides an operational example of generating an residual timeseries component for an input operational monitoring timeseries trend in accordance with some embodiments discussed herein.

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention introduce technical advantages related to detecting anomalous conditions of a monitored computer system. In doing so, the noted embodiments of the present invention improve the operational reliability and resilience of the monitored computer system by enabling detection anomalous behavior periods for the monitored computer system and proactively addressing those detection anomalous behavior periods by eliminating the inferred causes for the noted anomalous system behaviors.

Various embodiments of the present invention improve computational efficiency of performing reliable persistent monitoring of a computer system. Persistent monitoring of the operations of a computer system has various operational reliability benefits for various computer systems and is an important part of service level objectives for highly maintenance-critical computer systems. However, doing the noted persistent monitoring operations in a reliable manner requires access to large amounts of labeled training data that are not always available for more customized computer systems with unique operational/behaviorial pattern signatures. In response, various embodiments of the present invention address the noted challenges by generating training data for an anomalous operational state detection machine learning model whose training data may be generated using a ground-truth validation criterion that is defined based at least in part on an inferred outlier score for a decomposed residual component of a given operational monitoring timeseries trend. In doing so, the noted embodiments of the present invention enable generating training data for a model that is configured to persistently and reliably predict anomalous conditions of a monitored computer system in an automated and efficient manner using computationally simple timeseries processing operations. Accordingly, various embodiments of the present invention improve computational efficiency of performing reliable persistent monitoring of a computer system by enabling automated and reliable generation of training data for an anomalous operational state detection machine learning model.

II. Definitions

The term "operational monitoring timeseries trend" may refer to a data construct that describes a monitored system condition of a monitored computer system during a respective time period known as the monitoring period. For example, in some embodiments, an operational monitoring timeseries trend describes at least one of a processor utilization measure, a memory utilization measure, network throughput measure, and/or the like for a monitored computer system during a particular monitoring period, such as during a five-minute time period. In some embodiments, the system monitoring computing entity 109 periodically (e.g., every five period) provides operational monitoring data collected during real-time and/or near-real-time monitoring of one or more target system condition measures of the monitored computer system. In some of the noted embodiments, each periodically-reported operational monitoring data segment is an operational monitoring timeseries trend that is associated with a respective monitoring period that includes the period starting from the transmission time of a preceding periodically-reported operational monitoring data segment and ending with the transmission time of a subsequent periodically-reported operational monitoring data segment.

The term "initial anomaly designation" may refer to a data construct that describes a predicted/computed value for a respective operational monitoring timeseries trend that describes whether feature data associated with the respective operational monitoring timeseries trend should be further processed by an anomalous operational state detection machine learning model to generate an inferred anomaly classification score for the respective operational monitoring timeseries trend. In some embodiments, if the initial anomaly designation for a respective operational monitoring timeseries trend is a positive initial anomaly designation (i.e., is an initial anomaly designation that describes that the respective operational monitoring timeseries trend is suspected of being anomalous), then the noted operational monitoring timeseries trend is further processed by an anomalous operational state detection machine learning model to generate an inferred anomaly classification score for the operational timeseries tend. Accordingly, in some embodiments, one objective of generating initial anomaly designations for operational monitoring timeseries trends is to reduce the operational load of anomalous operational state detection machine learning models by limiting the operations of the anomalous operational state detection machine learning model to those related to processing feature data associated with operational monitoring timeseries trends that have positive initial anomaly designations.

The term "initial anomaly designation machine learning model" may refer to a data construct that describes parameter, hyper-parameters, and/or defined operations of a machine learning model that is configured to utilize one or more supervised machine learning techniques and/or one or more unsupervised machine learning techniques to generate the initial anomaly designation for the respective operational monitoring timeseries trend. Examples of supervised machine learning techniques that may be used by an initial anomaly designation machine learning model may include one or more of techniques that use one or more trained feedforward neural network machine learning models to generate output data that can be used to generate initial anomaly designations, techniques that use trained recurrent neural network machine learning models (e.g., one or more trained long short term memory recurrent neural network machine learning models) to generate output data that can be used to generate initial anomaly designations, techniques that use one or more trained attention-based timeseries processing machine learning models to generate output data that can be used to generate initial anomaly designations, and/or the like. Examples of unsupervised machine learning techniques that may be used by an initial anomaly designation machine learning model may include one or more of techniques that cluster embedded representations of a set of operational monitoring timeseries trends and use output data generated based at least in part on the noted clusters to generate initial anomaly designations, techniques that generate an initial anomaly designation for an operational monitoring timeseries trend based at least in part on a forecasting deviation measure that is a measure of deviation between the operational monitoring timeseries trend and an operational forecast timeseries trend for the respective monitoring time period of the operational monitoring timeseries trend, and/or the like. In some embodiments, the initial anomaly designation machine learning model comprises at least one of: (i) an unsupervised forecast-deviation-based initial anomaly designation machine learning model that is configured to generate the initial anomaly designation for a particular operational monitoring timeseries trend based at least in part on a forecasting deviation measure for the particular operational monitoring timeseries trend, and (ii) a supervised recurrent neural network initial anomaly designation machine learning model that is configured to generate the initial anomaly designation for the particular operational monitoring timeseries trend using the hidden state generated by a final timestep of the supervised recurrent neural network initial anomaly designation machine learning model that is generated via sequentially processing the particular operational monitoring timeseries trend.

The term "operational forecasting timeseries trend" may refer to a data construct that describes a forecasted system condition for a monitored computer system during a respective monitoring period. In some embodiments, while the operational monitoring timeseries trend for a monitoring period describes the monitored/recorded/observed system condition during the noted monitoring period, the operational forecasting timeseries trend describes a forecasted system condition for a monitored computer system. In some embodiments, periodically (e.g., every two days), a historical operational monitoring timeseries trend is used to generate forecasted system conditions during a forecast period that is in the future. Then, once monitored/recorded/observed system condition data for the forecast period is received, the monitored/recorded/observed system conditions can be compared with the forecasted system conditions for that same period to determine whether the monitored/recorded/observed system conditions correspond to expected system conditions as described by forecasted system conditions, and the results of the comparison can be used to generate an anomaly designation for the time period. For example, consider an operational forecasting machine learning model that is configured to process historical operational monitoring timeseries trend for a week-long historical monitoring period to generate an operational forecast timeseries trend for a forecast period that includes two days after the end of the week period. In this example, if, on Jul. 18, 2022, the historical operational monitoring timeseries trend for the historical monitoring period of Jul. 10, 2022 to Jul. 17, 2022 is processed by the operational forecasting machine learning model to generate an operational forecast timeseries trend for the forecast period Jul. 18, 2022 to Jul. 20, 2022, then the resulting operational forecast timeseries trend now includes the operational forecast timeseries trend for the period between 2:00 PM Jul. 18, 2022 to 2:05 PM Jul. 18, 2022. Continuing with this example, if, at 2:06 PM Jul. 18, 2022, the operational monitoring timeseries trend for the monitoring period between 2:00 PM Jul. 18, 2022 to 2:05 PM Jul. 18, 2022 is received, then this operational monitoring timeseries trend can be compared with (e.g., subtracted from) the operational forecast timeseries trend for the same time period (e.g., for the period between 2:00 PM Jul. 18, 2022 to 2:05 PM Jul. 18, 2022) to generate a forecasting deviation measure that can in turn be used to determine the initial anomaly designation for the monitoring period between 2:00 PM Jul. 18, 2022 to 2:05 PM Jul. 18, 2022.

The term "operational forecasting machine learning model" may refer to a data construct that describes parameters, hyper-parameters, and/or defined operations of a machine learning model that is configured to process a historical operational monitoring timeseries trend for a historical monitoring period to generate an operational forecast timeseries trend for a future forecast period that occurs after the historical monitoring period. Accordingly, the operational forecasting machine learning model may comprise a timeseries-based forecasting model that is configured to infer a forecast timeseries trend based at least in part on a historical monitoring timeseries trend. In some embodiments, the operational forecasting machine learning model comprises one or more timeseries-based forecasting models, such as autoregressive (AR) timeseries-based forecasting model, an autoregressive moving average (ARMA) timeseries-based forecasting model, an autoregressive integrated moving average (ARIMA) timeseries-based forecasting model, and/or the like. In some embodiments, inputs to the operational forecasting machine learning model comprise a vector describing a historical operational monitoring timeseries trend and outputs of the operational forecasting machine learning model comprise a vector describing an operational forecast timeseries trend. In some embodiments, at least one of the length/duration of the historical monitoring period associated with the historical operational monitoring timeseries trend that is provided as an input to the operational forecasting machine learning model or the length/duration of the forecasting period of the operational forecast timeseries trend that is generated as an output of the operational forecasting machine learning model is determined by configuration hyper-parameter data associated with the operational forecasting machine learning model. In some embodiments, to generate the operational forecast timeseries trend for a particular monitoring period, the operational forecasting machine learning model may need as an input the historical operational monitoring timeseries trend for a historical monitoring period whose respective forecast period comprises the particular monitoring period. For example, if the forecast period as defined by the configuration hyper-parameter data of an operational forecasting machine learning model is two-day long period, then, to generate the operational forecast timeseries trend for a particular monitoring period, the operational forecasting machine learning model may need as an input the historical operational monitoring timeseries trend for a historical monitoring period that ends within two days of the end of the particular monitoring period.

The term "forecasting deviation measure" may refer to a data construct that describes a measure of deviation between a respective operational monitoring timeseries trend and a respective operational forecast timeseries trend, where the monitoring period for the respective operational monitoring timeseries trend and the forecast period for the respective operational forecast timeseries trend is the same period. In some embodiments, if a monitoring/forecast period comprises N timestamps (i.e., such that the respective operational monitoring timeseries trend comprises a sequence of N operational monitoring values and the respective operational forecast timeseries trend comprises a sequence of N operational forecast values), then forecasting deviation measure for the respective operational monitoring timeseries trend and the respective operational forecast timeseries trend that are associated with the noted monitoring/forecast period can be generated based at least in part on the output of the equation $$\frac{1}{N}\sum_{n=1}^{N}|f_n - m_n|,$$

where $f_n$ describes the operational forecast value for the nth timestamp in the monitoring/forecast period as described by the respective operational forecast timeseries trend for the monitoring/forecast period, while $m_n$ describes the operational monitoring value for the nth timestamp in the monitoring/forecast period as described by the respective operational monitoring timeseries trend for the monitoring/forecast period.

The term "forecasting deviation measure threshold" may refer to a data construct that describes a value that, if satisfied (e.g., exceeded) by a forecasting deviation measure for a given operational monitoring timeseries trend, leads to a determination that the given operational monitoring timeseries trend is associated with a positive initial anomaly designation. In some embodiments, the forecasting deviation measure threshold is determined based at least in part on a deviance measure for forecasting deviation measures of a corpus of operational monitoring timeseries trends. In other words, in some embodiments, for each operational monitoring timeseries trend in a corpus of operational monitoring timeseries trends, a forecasting deviation measure is determined, and then a deviation measure of the computed forecasting deviation measures is set as the forecasting deviation measure threshold. In some embodiments, the forecasting deviation measure threshold is determined based at least in part on a root mean square error measure for forecasting deviation measures of a corpus of operational monitoring timeseries trends. In other words, in some embodiments, for each operational monitoring timeseries trend in a corpus of operational monitoring timeseries trends, a forecasting deviation measure is determined, and then a root mean square error measure of the computed forecasting deviation measures is set as the forecasting deviation measure threshold.

The term "anomalous operational state detection machine learning model" may refer to a data construct that describes parameters, hyper-parameters, and/or defined operations of a machine learning model that is configured to process feature data associated with an operational monitoring timeseries trend to generate an inferred anomaly classification score for the operational monitoring timeseries trend. For example, in some embodiments, the anomalous operational state detection machine learning model is configured to process feature data associated with an operational monitoring timeseries trend such as one or more statistical features of the operational monitoring timeseries trend, a time-of-day category designator for the monitoring period that is associated with the operational monitoring timeseries trend, a day-of-week category designator for the monitoring period that is associated with operational monitoring timeseries trend, an affected/suboptimal system component during the monitoring period that is associated with the operational monitoring timeseries trend, a count of anomalous condition reporting tickets (e.g., remedy tickets) that are generated during the monitoring period that is associated with the operational monitoring timeseries trend, and/or the like to generate the inferred anomaly classification score for the operational monitoring timeseries trend. In some embodiments, the anomalous operational state detection machine learning model is a machine learning model that is configured to process a set of input features for a captured/monitored period of operation of a monitored computer system to determine a classification score that describes at least one (e.g., both of) a predicted likelihood that the captured/monitored period is an anomalous period and/or a predicted likelihood that the captured/monitored period is a non-anomalous/normal period. In some embodiments, the anomalous operational state detection machine learning model is a supervised machine learning model. In some embodiments, the anomalous operational state detection machine learning model comprises an ensemble model that is configured to aggregate predictions from a group of machine learning models including a linear regression model and a gradient boost regressor model in order to generate the described classification score.

The term "positive operational monitoring timeseries trend" may refer to a data construct that describes an operational monitoring timeseries trend that is associated with a respective monitoring period that is determined to be an anomalous activity period for a respective computer system as determined based at least in part on one or more ground-truth validation criteria. In some embodiments, a ground-truth validation criterion describes a defined condition that, if satisfied by the feature data associated with a particular operational monitoring timeseries trend, causes a proposed system to classify the particular operational monitoring timeseries trend as a positive operational monitoring timeseries trend. In some embodiments, when a particular operational monitoring timeseries trend satisfies at least one of the defined ground-truth validation criteria, then the particular operational monitoring timeseries trend is classified as a positive operational monitoring timeseries trend.

The term "ground-truth validation criterion" may refer to a data construct that describes a defined condition that, if satisfied by the feature data associated with a particular operational monitoring timeseries trend, causes a proposed system to classify the particular operational monitoring timeseries trend as a positive operational monitoring timeseries trend. For example, in some embodiments, a ground-truth validation criterion is defined based at least in part on an inferred outlier score for a decomposed residual component of a given operational monitoring timeseries trend. In some embodiments, the noted ground-truth validation criterion is satisfied when the inferred outlier score for the decomposed residual component of a given operational monitoring timeseries trend satisfies (e.g., exceeds) an inferred outlier score threshold. In some of the noted embodiments, if the inferred outlier score for the decomposed residual component of a given operational monitoring timeseries trend satisfies the inferred outlier score threshold, then the given operational monitoring timeseries trend is classified as a positive operational monitoring timeseries trend. However, if the inferred outlier score for the decomposed residual component of a given operational monitoring trend fails to satisfy the inferred outlier score threshold, then the given operational monitoring timeseries trend is classified as a negative operational monitoring timeseries trend.

The term "inferred outlier score" may refer to a data construct that describes a computed/predicted/inferred likelihood that a decomposed residual component of a respective operational monitoring timeseries trend is outlier relative to an expected/observed profile for decomposed residual component of a normal/non-outlier operational monitoring timeseries trend. In some embodiments, to generate the inferred outlier score for a respective operational monitoring timeseries trend, the following operations are performed: (i) the respective operational monitoring timeseries trend is processed using a timeseries decomposition routine (e.g., a Seasonal and Trend Decomposition (STL) routine) to generate the decomposed residual component of the respective operational monitoring timeseries trend (e.g., by removing, from the respective operational monitoring timeseries trend, a decomposed trend component of the respective operational monitoring timeseries trend and a decomposed seasonality component of the respective operational monitoring timeseries trend), and (ii) the decomposed operational monitoring timeseries trend for the respective operational monitoring timeseries trend is processed using an outlier detection routine (e.g., a normal-distribution-based univariate-data single-outlier detection routine, such as an extreme studentized deviate (ESD) test or other adjusted Grubbs's-test-based routine) to generate the inferred outlier score (e.g., an extreme studentized deviate score) for the respective operational monitoring timeseries trend. In some embodiments, the inferred outlier score for a respective operational monitoring timeseries trend is an extreme studentized deviate score for the respective operational monitoring timeseries trend.

The term "negative operational monitoring timeseries trend" may refer to a data construct that describes an operational monitoring timeseries trend that is associated with a respective monitoring period that is determined to be a non-anomalous/normal activity period for a respective computer system as determined based at least in part on one or more ground-truth validation criteria. In some embodiments, a ground-truth validation criterion describes a defined condition that, if satisfied by the feature data associated with a particular operational monitoring timeseries trend, causes a proposed system to classify the particular operational monitoring timeseries trend as a positive operational monitoring timeseries trend. In some embodiments, when a particular operational monitoring timeseries trend fails to satisfy any of the defined ground-truth validation criteria, then the particular operational monitoring timeseries trend is classified as a negative operational monitoring timeseries trend.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

Methods, apparatuses, and computer program products of the present invention may be embodied by any of a variety of entities. For example, the method, apparatus, and computer program product of an example embodiment may be embodied by a networked entity (e.g., an enterprise platform), such as a server or other network entity, configured to communicate with one or more entities, such as one or more query-initiating computing entities. Additionally or alternatively, the computing entity may include fixed computing entities, such as a personal computer or a computer workstation. Still further, example embodiments may be embodied by any of a variety of mobile entities, such as a portable digital assistant (PDA), mobile telephone, smartphone, laptop computer, tablet computer, wearable, or any combination of the aforementioned entities.

FIG. 1 depicts an exemplary architecture 100 for performing predictive monitoring of a monitored computer system that is associated with one or more software application monitoring computing entities 109. The architecture 100 includes one or more client computing entities 102, a predictive data analysis system 101, and the one or more software application monitoring computing entities 109.

The one or more software application monitoring computing entities 109 are configured to transmit system monitoring data objects to the predictive data analysis system 101, which the predictive data analysis system 101 may store in the monitoring data storage unit 121 in the storage subsystem 108 of the predictive data analysis system 101. The predictive data analysis computing entity 106 may generate, using the training engine 112, one or more machine learning models based at least in part on training data stored in a training data storage unit 122. The predictive data analysis computing entity 106 may further process, using a model execution engine 113, the system monitoring data objects that are stored in the monitoring data storage unit 121 using the model configuration data that are stored in the model configuration data storage unit 123 in the storage subsystem 108 of the predictive data analysis system 101 in order to generate prediction outputs that are transmitted to the client computing entities 102 via a frontend engine 114 of the predictive data analysis computing entity 106.

The client computing entities 102, the software application monitoring computing entities 109, and the predictive data analysis computing entity 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

C. Exemplary System Monitoring Computing Entity

FIG. 4 provides a schematic of a system monitoring computing entity 109 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the system monitoring computing entity 109 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the system monitoring computing entity 109 may include, or be in communication with, one or more processing elements 405 (also referred to as processors, processing circuitry, and/or similar terms used herein interchangeably) that communicate with other elements within the system monitoring computing entity 109 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the system monitoring computing entity 109 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system monitoring computing entity 109 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the system monitoring computing entity 109 with the assistance of the processing element 405 and operating system.

As indicated, in one embodiment, the system monitoring computing entity 109 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system monitoring computing entity 109 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system monitoring computing entity 109 may include, or be in communication with, one or more input elements, such as a keyboard input, a mouse input, a touch screen/display input, motion input, movement input, audio input, pointing device input, joystick input, keypad input, and/or the like. The system monitoring computing entity 109 may also include, or be in communication with, one or more output elements (not shown), such as audio output, video output, screen/display output, motion output, movement output, and/or the like.

V. Exemplary System Operations

As described herein, various embodiments of the present invention improve computational efficiency of performing reliable persistent monitoring of a computer system. Persistent monitoring of the operations of a computer system has various operational reliability benefits for various computer systems and is an important part of service level objectives for highly maintenance-critical computer systems. However, doing the noted persistent monitoring operations in a reliable manner requires access to large amounts of labeled training data that are not always available for more customized computer systems with unique operational/behaviorial pattern signatures. In response, various embodiments of the present invention address the noted challenges by generating training data for an anomalous operational state detection machine learning model whose training data may be generated using a ground-truth validation criterion that is defined based at least in part on an inferred outlier score for a decomposed residual component of a given operational monitoring timeseries trend. In doing so, the noted embodiments of the present invention enable generating training data for a model that is configured to persistently and reliably predict anomalous conditions of a monitored computer system in an automated and efficient manner using computationally simple timeseries processing operations. Accordingly, various embodiments of the present invention improve computational efficiency of performing reliable persistent monitoring of a computer system by enabling automated and reliable generation of training data for an anomalous operational state detection machine learning model.

FIG. 5 is a flowchart diagram of an example process 500 for generating an inferred anomaly classification score for an input operational monitoring timeseries trend. Via the various steps/operations of the process 500, the predictive data analysis computing entity 106 can perform advanced anomaly classification with respect to an incoming stream of operational monitoring timeseries trends while avoiding the need to perform computationally resource-intensive deep learning operations on the entirety of the incoming stream and/or while avoiding the need to perform computationally resource-intensive outlier detection operations on any of the operational monitoring timeseries trends in the noted incoming stream.

The process 500 begins at step/operation 501 when the predictive data analysis computing entity 106 identifies (e.g., receives, retrieves, generates, and/or the like) the input operational monitoring timeseries trend. In some embodiments, the input operational monitoring timeseries trend describes a monitored system condition of a monitored computer system (e.g., a monitored computer system that is configured to execute/perform operations corresponding to a software application framework) during a target monitoring period.

In some embodiments, an operational monitoring timeseries trend describes a monitored system condition of a monitored computer system during a respective time period known as the monitoring period. For example, in some embodiments, an operational monitoring timeseries trend describes at least one of a processor utilization measure, a memory utilization measure, network throughput measure, and/or the like for a monitored computer system during a particular monitoring period, such as during a five-minute time period. In some embodiments, the system monitoring computing entity 109 periodically (e.g., every five period) provides operational monitoring data collected during real-time and/or near-real-time monitoring of one or more target system condition measures of the monitored computer system. In some of the noted embodiments, each periodically-reported operational monitoring data segment is an operational monitoring timeseries trend that is associated with a respective monitoring period that includes the period starting from the transmission time of a preceding periodically-reported operational monitoring data segment and ending with the transmission time of a subsequent periodically-reported operational monitoring data segment.

In some embodiments, an operational monitoring timeseries trend comprises one or more recorded time series sets, where each recorded time series set comprises a sequence of monitored system condition measures for a monitored computer system during a set of timestamps associated with the respective monitoring period for the operational monitoring timeseries trend. For example, in some embodiments, when an operational monitoring timeseries trend is associated with more than one target system condition measures (e.g., a processor utilization measure and a memory utilization measure), the operational monitoring timeseries trend comprises a respective time series set for each target system condition measure (e.g., a first timeseries set that describes a sequence of recorded processor utilization measure values during the respective monitoring period and a second timeseries set that describes a sequence of recorded memory utilization measure values during the respective monitoring period). As another example, in some embodiments, when an operational monitoring timeseries trend is associated with more than one target system condition measures (e.g., a processor utilization measure and a memory utilization measure), the operational monitoring timeseries trend comprises a single timeseries set for a compound system condition measure that is generated by combining the two or more target system condition measures (e.g., a single timeseries set that describes, for each timestamp in the respective monitoring period, the product of the processor utilization measure for the noted timestamp and the memory utilization measure for the noted timestamp).

An operational example of an operational monitoring timeseries trend 600 is depicted in FIG. 6. As depicted in FIG. 6, the operational monitoring timeseries trend 600 describes, using the values of the depicted timeseries graph, a sequence of monitored system condition measures for a monitored computer system during a monitoring period 611 that is associated with the horizontal axis of the operational monitoring timeseries trend 600. In some embodiments, the operational monitoring timeseries trend describes variations of one or more operational metrics (e.g., memory usage amount, processor usage amount, operational load measure, operational security measure, and/or the like) for the monitored computer system across a sequence of timestamps. In some embodiments, the operational monitoring timeseries trend defines a cross-temporal relationship that may be associated with one or more trend components, one or more seasonality components, and one or more residual components.

Returning to FIG. 5, at step/operation 502, the predictive data analysis computing entity 106 generates an initial anomaly designation for the input operational monitoring timeseries trend. The initial anomaly designation may be a predicted/computed value for a respective operational monitoring timeseries trend that describes whether feature data associated with the respective operational monitoring timeseries trend should be further processed by an anomalous operational state detection machine learning model to generate an inferred anomaly classification score for the respective operational monitoring timeseries trend. In some embodiments, if the initial anomaly designation for a respective operational monitoring timeseries trend is a positive initial anomaly designation (i.e., is an initial anomaly designation that describes that the respective operational monitoring timeseries trend is suspected of being anomalous), then the noted operational monitoring timeseries trend is further processed by an anomalous operational state detection machine learning model to generate an inferred anomaly classification score for the operational timeseries tend. Accordingly, in some embodiments, one objective of generating initial anomaly designations for operational monitoring timeseries trends is to reduce the operational load of anomalous operational state detection machine learning models by limiting the operations of the anomalous operational state detection machine learning model to those related to processing feature data associated with operational monitoring timeseries trends that have positive initial anomaly designations.

In some embodiments, the initial anomaly designation for a respective operational monitoring timeseries trend is generated using an initial anomaly designation machine learning model. The initial anomaly designation machine learning model may be configured to utilize one or more supervised machine learning techniques and/or one or more unsupervised machine learning techniques to generate the initial anomaly designation for the respective operational monitoring timeseries trend. Examples of supervised machine learning techniques that may be used by an initial anomaly designation machine learning model may include one or more of techniques that use one or more trained feedforward neural network machine learning models to generate output data that can be used to generate initial anomaly designations, techniques that use trained recurrent neural network machine learning models (e.g., one or more trained long short term memory recurrent neural network machine learning models) to generate output data that can be used to generate initial anomaly designations, techniques that use one or more trained attention-based timeseries processing machine learning models to generate output data that can be used to generate initial anomaly designations, and/or the like. Examples of unsupervised machine learning techniques that may be used by an initial anomaly designation machine learning model may include one or more of techniques that cluster embedded representations of a set of operational monitoring timeseries trends and use output data generated based at least in part on the noted clusters to generate initial anomaly designations, techniques that generate an initial anomaly designation for an operational monitoring timeseries trend based at least in part on a forecasting deviation measure that is a measure of deviation between the operational monitoring timeseries trend and an operational forecast timeseries trend for the respective monitoring time period of the operational monitoring timeseries trend, and/or the like.

In some embodiments, the initial anomaly designation machine learning model comprises at least one of: (i) an unsupervised forecast-deviation-based initial anomaly designation machine learning model that is configured to generate the initial anomaly designation for a particular operational monitoring timeseries trend based at least in part on a forecasting deviation measure for the particular operational monitoring timeseries trend, and (ii) a supervised recurrent neural network initial anomaly designation machine learning model that is configured to generate the initial anomaly designation for the particular operational monitoring timeseries trend using the hidden state generated by a final timestep of the supervised recurrent neural network initial anomaly designation machine learning model that is generated via sequentially processing the particular operational monitoring timeseries trend. For example, in some embodiments, the initial anomaly designation for a particular operational monitoring timeseries trend is generated based at least in part on whether the forecasting deviation measure for the particular operational monitoring timeseries trend satisfies (e.g., exceeds) a forecasting deviation measure threshold. As another example, in some embodiments, the initial anomaly designation for a particular operational monitoring timeseries trend is generated based at least in part on whether the output score generated by performing a softmax operation on the final hidden state generated by the supervised recurrent neural network initial anomaly designation machine learning model via sequentially processing the particular operational monitoring timeseries trend satisfies an output score threshold.

As yet another example, in some embodiments, given a particular operational monitoring timeseries trend: (i) if both (a) the forecasting deviation measure for the particular operational monitoring timeseries trend satisfies (e.g., exceeds) a forecasting deviation measure threshold and (b) the output score generated by performing a softmax operation on the final hidden state generated by the supervised recurrent neural network initial anomaly designation machine learning model via sequentially processing the particular operational monitoring timeseries trend satisfies an output score threshold, then the particular operational monitoring timeseries trend is assigned a positive initial anomaly designation, and (ii) otherwise, the particular operational monitoring timeseries trend is assigned a negative initial anomaly designation.

As a further example, in some embodiments, given a particular operational monitoring timeseries trend: (i) if either (a) the forecasting deviation measure for the particular operational monitoring timeseries trend satisfies (e.g., exceeds) a forecasting deviation measure threshold, (b) the output score generated by performing a softmax operation on the final hidden state generated by the supervised recurrent neural network initial anomaly designation machine learning model via sequentially processing the particular operational monitoring timeseries trend satisfies an output score threshold, or (c) both, then the particular operational monitoring timeseries trend is assigned a positive initial anomaly designation, and (ii) otherwise, the particular operational monitoring timeseries trend is assigned a negative initial anomaly designation.

As described above, in some embodiments, the initial anomaly designation machine learning model comprises an unsupervised forecast-deviation-based initial anomaly designation machine learning model. FIG. 7 is a flowchart diagram of an example process for generating an initial anomaly designation for an input operational monitoring timeseries trend using an initial anomaly designation machine learning model that comprises an unsupervised forecast-deviation-based initial anomaly designation machine learning model. As depicted in FIG. 7, the process begins at step/operation 701 when the predictive data analysis computing entity 106 generates an operational forecast timeseries trend for the target monitoring period that is associated with the input operational monitoring timeseries trend.

In some embodiments, an operational forecasting timeseries trend describes a forecasted system condition for a monitored computer system during a respective monitoring period. In some embodiments, while the operational monitoring timeseries trend for a monitoring period describes the monitored/recorded/observed system condition during the noted monitoring period, the operational forecasting timeseries trend describes a forecasted system condition for a monitored computer system. In some embodiments, periodically (e.g., every two days), a historical operational monitoring timeseries trend is used to generate forecasted system conditions during a forecast period that is in the future. Then, once monitored/recorded/observed system condition data for the forecast period is received, the monitored/recorded/observed system conditions can be compared with the forecasted system conditions for that same period to determine whether the monitored/recorded/observed system conditions correspond to expected system conditions as described by forecasted system conditions, and the results of the comparison can be used to generate an anomaly designation for the time period.

For example, consider an operational forecasting machine learning model that is configured to process historical operational monitoring timeseries trend for a week-long historical monitoring period to generate an operational forecast timeseries trend for a forecast period that includes two days after the end of the week period. In this example, if, on Jul. 18, 2022, the historical operational monitoring timeseries trend for the historical monitoring period of Jul. 10, 2022 to Jul. 17, 2022 is processed by the operational forecasting machine learning model to generate an operational forecast timeseries trend for the forecast period Jul. 18, 2022 to Jul. 20, 2022, then the resulting operational forecast timeseries trend now includes the operational forecast timeseries trend for the period between 2:00 PM Jul. 18, 2022 to 2:05 PM Jul. 18, 2022. Continuing with this example, if, at 2:06 PM Jul. 18, 2022, the operational monitoring timeseries trend for the monitoring period between 2:00 PM Jul. 18, 2022 to 2:05 PM Jul. 18, 2022 is received, then this operational monitoring timeseries trend can be compared with (e.g., subtracted from) the operational forecast timeseries trend for the same time period (e.g., for the period between 2:00 PM Jul. 18, 2022 to 2:05 PM Jul. 18, 2022) to generate a forecasting deviation measure that can in turn be used to determine the initial anomaly designation for the monitoring period between 2:00 PM Jul. 18, 2022 to 2:05 PM Jul. 18, 2022.

As described above, in some embodiments, the operational forecast timeseries trend for a particular monitoring period is generated by an operational forecasting machine learning model. An operational forecasting machine learning model may be configured to process a historical operational monitoring timeseries trend for a historical monitoring period to generate an operational forecast timeseries trend for a future forecast period that occurs after the historical monitoring period. Accordingly, the operational forecasting machine learning model may comprise a timeseries-based forecasting model that is configured to infer a forecast timeseries trend based at least in part on a historical monitoring timeseries trend. In some embodiments, the operational forecasting machine learning model comprises one or more timeseries-based forecasting models, such as autoregressive (AR) timeseries-based forecasting model, an autoregressive moving average (ARMA) timeseries-based forecasting model, an autoregressive integrated moving average (ARIMA) timeseries-based forecasting model, and/or the like.

In some embodiments, inputs to the operational forecasting machine learning model comprise a vector describing a historical operational monitoring timeseries trend and outputs of the operational forecasting machine learning model comprise a vector describing an operational forecast timeseries trend. In some embodiments, at least one of the length/duration of the historical monitoring period associated with the historical operational monitoring timeseries trend that is provided as an input to the operational forecasting machine learning model or the length/duration of the forecasting period of the operational forecast timeseries trend that is generated as an output of the operational forecasting machine learning model is determined by configuration hyper-parameter data associated with the operational forecasting machine learning model. In some embodiments, to generate the operational forecast timeseries trend for a particular monitoring period, the operational forecasting machine learning model may need as an input the historical operational monitoring timeseries trend for a historical monitoring period whose respective forecast period comprises the particular monitoring period. For example, if the forecast period as defined by the configuration hyper-parameter data of an operational forecasting machine learning model is two-day long period, then, to generate the operational forecast timeseries trend for a particular monitoring period, the operational forecasting machine learning model may need as an input the historical operational monitoring timeseries trend for a historical monitoring period that ends within two days of the end of the particular monitoring period.

In some embodiments, an operational forecasting machine learning model is trained using a set of training data entries, where each training data entry comprises: (i) as input training data, a historical operational monitoring timeseries trend that is associated with a historical monitoring period that is sufficiently in the past such that the operational monitoring timeseries trend for the respective forecast period of the noted historical monitoring period, and (ii) as ground-truth output data, the operational monitoring timeseries trend for the respective forecast period of the historical monitoring training data that is associated with the noted historical operational monitoring timeseries trend. For example, if the forecast period duration for an operational forecasting machine learning model as defined by the configuration hyper-parameter data for the operational forecasting machine learning model is two days, then an example training data entry may include: (i) as input training data, a historical operation monitoring timeseries trend for a historical monitoring period that ends at a timestamp that is two days or more earlier, and (ii) as ground-truth output data, the operational monitoring timeseries trend for a period that starts after the above-noted ending timestamp for the noted historical monitoring period and ends two days after the starting timestamp.

Returning to FIG. 7, at step/operation 702, the predictive data analysis computing entity 106 generates a forecasting deviation measure for the input operational monitoring timeseries trend. In some embodiments, the forecasting deviation measure describes a measure of deviation between a respective operational monitoring timeseries trend and a respective operational forecast timeseries trend, where the monitoring period for the respective operational monitoring timeseries trend and the forecast period for the respective operational forecast timeseries trend is the same period. In some embodiments, if a monitoring/forecast period comprises N timestamps (i.e., such that the respective operational monitoring timeseries trend comprises a sequence of N operational monitoring values and the respective operational forecast timeseries trend comprises a sequence of N operational forecast values), then forecasting deviation measure for the respective operational monitoring timeseries trend and the respective operational forecast timeseries trend that are associated with the noted monitoring/forecast period can be generated based at least in part on the output of the equation $1/N\Sigma_{n=1}^{N}|f_n-m_n|$, where $f_n$ describes the operational forecast value for the nth timestamp in the monitoring/forecast period as described by the respective operational forecast timeseries trend for the monitoring/forecast period, while $m_n$ describes the operational monitoring value for the nth timestamp in the monitoring/forecast period as described by the respective operational monitoring timeseries trend for the monitoring/forecast period.

At step/operation 703, the predictive data analysis computing entity 106 generates the initial anomaly designation for the input operational monitoring timeseries trend based at least in part on whether the forecasting deviation measure for the input operational monitoring timeseries trend satisfies (e.g., exceeds) a forecasting deviation measure threshold. In some embodiments, if the forecasting deviation measure for the input operational monitoring timeseries trend satisfies (e.g., exceeds) a forecasting deviation measure threshold, then the operational monitoring timeseries trend is assigned a positive initial anomaly designation. In some embodiments, if the forecasting deviation measure for the input operational monitoring timeseries trend fails to satisfy (e.g., exceed) a forecasting deviation measure threshold, then the operational monitoring timeseries trend is assigned a negative initial anomaly designation.

In some embodiments, a forecasting deviation measure threshold describes a value that, if satisfied (e.g., exceeded) by a forecasting deviation measure for a given operational monitoring timeseries trend, leads to a determination that the given operational monitoring timeseries trend is associated with a positive initial anomaly designation. In some embodiments, the forecasting deviation measure threshold is determined based at least in part on a deviance measure for forecasting deviation measures of a corpus of operational monitoring timeseries trends. In other words, in some embodiments, for each operational monitoring timeseries trend in a corpus of operational monitoring timeseries trends, a forecasting deviation measure is determined, and then a deviation measure of the computed forecasting deviation measures is set as the forecasting deviation measure threshold. In some embodiments, the forecasting deviation measure threshold is determined based at least in part on a root mean square error measure for forecasting deviation measures of a corpus of operational monitoring timeseries trends. In other words, in some embodiments, for each operational monitoring timeseries trend in a corpus of operational monitoring timeseries trends, a forecasting deviation measure is determined, and then a root mean square error measure of the computed forecasting deviation measures is set as the forecasting deviation measure threshold.

Returning to FIG. 5, as described above, in some embodiments, the initial anomaly detection machine learning model comprises a supervised recurrent neural network initial anomaly designation machine learning model. In some embodiments, a supervised recurrent neural network initial anomaly designation machine learning model comprises a recurrent neural network machine learning model (e.g., a long short term memory recurrent neural network machine learning model) that is configured to sequentially process an input operational monitoring timeseries trend containing a sequence of N operational monitoring values using N timesteps to generate, at the end of the N timesteps, the initial anomaly designation for the particular input operational monitoring timeseries trend. In some embodiments, during an initial timestep, the recurrent neural network machine learning model is configured to process a default prior hidden state (e.g., an all-zero prior hidden state) and a first operational monitoring value of the N operational monitoring values to generate an updated hidden state for the initial timestep. In some embodiments, during each nth post-initial timestep, the recurrent neural network machine learning model is configured to process an updated hidden state generated by an (n−1)th timestep and an nth operational monitoring value of the N operational monitoring values to generate an updated hidden state for the nth post-initial timestep. In some embodiments, one or more operations (e.g., one or more softmax operations) are performed on the updated hidden state generated by the final timestep of the recurrent neural network machine learning model to generate an output score. Afterward, if this output score satisfies (e.g., exceeds) an output score threshold, the corresponding input operational monitoring timeseries trend may be assigned a positive initial anomaly designation, and if the output score fails to satisfy the output score threshold, then the corresponding input operational monitoring timeseries trend may be assigned a negative initial anomaly designation.

In some embodiments, inputs to a supervised recurrent neural network initial anomaly designation machine learning model comprise, for each nth timestep, a vector representation of the corresponding nth operational monitoring value of the input operational monitoring timeseries trend, as well as a default prior hidden state vector. In some embodiments, outputs of a supervised recurrent neural network initial anomaly designation machine learning model comprise a vector and/or an atomic value describing the output score for an input operational monitoring timeseries trend and/or the initial anomaly designation for the input operational monitoring timeseries trend. In some embodiments, the supervised recurrent neural network initial anomaly designation machine learning model is trained using training data generated based at least in part on ground-truth initial anomaly designations generated by subject matter experts and/or using training data generated based at least in part on positive/negative ground-truth labels for historical operational monitoring timeseries trends that are generated using techniques described below in relation to generating training data for an anomalous operational state detection machine learning model. For example, in some embodiments, if a historical operational monitoring timeseries trend is assigned a positive ground-truth label using the techniques described below, then the corresponding training data entry for the historical operational monitoring timeseries trend may describe a positive initial anomaly designation, while if the historical operational monitoring timeseries trend is assigned a negative ground-truth label using the techniques described, then the corresponding training data entry for the historical operational monitoring timeseries trend may describe a negative initial anomaly designation.

In the process 500 of FIG. 5, after generating the initial anomaly designation for the input operational monitoring timeseries trend at step/operation 502, at step/operation 503, the predictive data analysis computing entity 106 proceeds to determine whether the initial anomaly designation is a positive/positive initial anomaly designation. At step/operation 504, if the predictive data analysis computing entity 106 determines that the initial anomaly designation is a negative initial anomaly designation, then the predictive data analysis computing entity 106 generates the inferred anomaly classification score for the input operational monitoring timeseries trend based at least in part on the negative initial anomaly designation. For example, in some embodiments, if the predictive data analysis computing entity 106 determines that the initial anomaly designation is a negative initial anomaly designation, then the predictive data analysis computing entity 106 assigns a lowest inferred anomaly classification score (e.g., an inferred anomaly classification score of zero) to the input operational monitoring timeseries trend. However, at step/operation 505, if the predictive data analysis computing entity 106 determines that the initial anomaly designation is a positive initial anomaly designation, then the predictive data analysis computing entity 106 generates the inferred anomaly classification score for the input operational monitoring timeseries trend using an anomalous operational state detection machine learning model, as further described below.

In some embodiments, the anomalous operational state detection machine learning model is configured to process feature data associated with an operational monitoring timeseries trend to generate an inferred anomaly classification score for the operational monitoring timeseries trend. For example, in some embodiments, the anomalous operational state detection machine learning model is configured to process feature data associated with an operational monitoring timeseries trend such as one or more statistical features of the operational monitoring timeseries trend, a time-of-day category designator for the monitoring period that is associated with the operational monitoring timeseries trend, a day-of-week category designator for the monitoring period that is associated with operational monitoring timeseries trend, an affected/suboptimal system component during the monitoring period that is associated with the operational monitoring timeseries trend, a count of anomalous condition reporting tickets (e.g., remedy tickets) that are generated during the monitoring period that is associated with the operational monitoring timeseries trend, and/or the like to generate the inferred anomaly classification score for the operational monitoring timeseries trend.

In some embodiments, inputs to an anomalous operational state detection machine learning model comprise an input vector that describes one or more feature data entries for an input operational monitoring timeseries trend, while outputs of an anomalous operational state detection machine learning model comprise an output atomic value that describes the inferred anomaly classification score for the input operational monitoring timeseries trend. In some embodiments, the anomalous operational state detection machine learning model is a trained regression machine learning model, such as a trained regression machine learning model that uses one or more trained neural network layers (e.g., one or more feedforward fully-connected neural network layers). In some embodiments, the anomalous operational state detection machine learning model is trained using training data entries that are generated using one or more ground-truth validation criteria, such as a first ground-truth validation criterion that is defined based at least in part on an inferred outlier score for a decomposed residual component of a given operational monitoring timeseries trend, a second ground-truth validation criterion that is defined based at least in part on whether a particular operational monitoring timeseries trend is associated with a threshold number of anomalous condition reporting tickets, and/or the like.

In some embodiments, an inferred anomaly classification score describes a predicted/computed/inferred likelihood that the respective monitoring period for a corresponding operational monitoring timeseries trend is an anomalous activity period of a respective computer system. In some embodiments, if the anomaly classification score for a corresponding operational monitoring timeseries trend satisfies (e.g., exceeds) an anomaly classification score threshold, then a proposed system determines that the respective monitoring period for the corresponding operational monitoring timeseries trend is an anomalous activity period for the respective computer system. In some embodiments, if the anomaly classification score for a corresponding operational monitoring timeseries trend fails to satisfy (e.g., exceed) an anomaly classification score threshold, then a proposed system determines that the respective monitoring period for the corresponding operational monitoring timeseries trend is a non-anomalous/normal/ordinary activity period for the respective computer system.

In some embodiments, the anomalous operational state detection machine learning model is a machine learning model that is configured to process a set of input features for a captured/monitored period of operation of a monitored computer system to determine a classification score that describes at least one (e.g., both of) a predicted likelihood that the captured/monitored period is an anomalous period and/or a predicted likelihood that the captured/monitored period is a non-anomalous/normal period. In some embodiments, the anomalous operational state detection machine learning model is a supervised machine learning model. In some embodiments, the anomalous operational state detection machine learning model comprises an ensemble model that is configured to aggregate predictions from a group of machine learning models including a linear regression model and a gradient boost regressor model in order to generate the described classification score. In some embodiments, the anomalous operational state detection machine learning model is configured to: (i) process an operational state of a monitored computer system to determine a predicted operational behavior of the monitored computer system, and (ii) determine an anomaly score for the operational state based at least in part on a deviation measure for the predicted operational behavior and an observed operational behavior of the monitored computer system. In some embodiments, the anomalous operational state detection machine learning model is trained using a "positive control" training subset describing periods in which the monitored computer system is determined/detected to function/operate anomalously and a "negative control" training subset describing periods in which the monitored computer system is determined/detected to function/operate normally, where determining whether a monitored computer system is acting normally or anomalously in a particular period may in some embodiments be performed based at least in part on residual components determined via performing seasonal and trend decomposition on one or more timeseries trends associated with the monitored computer system during the particular period.

As described above, in some embodiments, the anomalous operational state detection machine learning model is trained using training data entries that are generated using one or more ground-truth validation criteria, such as a first ground-truth validation criterion that is defined based at least in part on an inferred outlier score for a decomposed residual component of a given operational monitoring timeseries trend, a second ground-truth validation criterion that is defined based at least in part on whether a particular operational monitoring timeseries trend is associated with a threshold number of anomalous condition reporting tickets, and/or the like. FIG. 8 is a flowchart diagram of an example process 800 for generating/training an anomalous operational state detection machine learning model using a set of ground-truth validation criteria. The process 800 begins at step/operation 801 when the predictive data analysis computing entity 106 identifies a corpus/set of operational monitoring timeseries trends, such as a corpus that comprises one or more historical operational monitoring timeseries trends.

At step/operation 802, the predictive data analysis computing entity 106 determines a positive subset of the corpus that comprises each operational monitoring timeseries trend that is determined to be a positive operational monitoring timeseries trend. A positive operational monitoring timeseries trend may be an operational monitoring timeseries trend that is associated with a respective monitoring period that is determined to be an anomalous activity period for a respective computer system as determined based at least in part on one or more ground-truth validation criteria. In some embodiments, a ground-truth validation criterion describes a defined condition that, if satisfied by the feature data associated with a particular operational monitoring timeseries trend, causes a proposed system to classify the particular operational monitoring timeseries trend as a positive operational monitoring timeseries trend. In some embodiments, when a particular operational monitoring timeseries trend satisfies at least one of the defined ground-truth validation criteria, then the particular operational monitoring timeseries trend is classified as a positive operational monitoring timeseries trend.

For example, in some embodiments, a ground-truth validation criterion is defined based at least in part on an inferred outlier score for a decomposed residual component of a given operational monitoring timeseries trend. In some embodiments, the noted ground-truth validation criterion is satisfied when the inferred outlier score for the decomposed residual component of a given operational monitoring timeseries trend satisfies (e.g., exceeds) an inferred outlier score threshold. In some of the noted embodiments, if the inferred outlier score for the decomposed residual component of a given operational monitoring timeseries trend satisfies the inferred outlier score threshold, then the given operational monitoring timeseries trend is classified as a positive operational monitoring timeseries trend. However, if the inferred outlier score for the decomposed residual component of a given operational monitoring trend fails to satisfy the inferred outlier score threshold, then the given operational monitoring timeseries trend is classified as a negative operational monitoring timeseries trend.

In some embodiments, the inferred outlier score describes a computed/predicted/inferred likelihood that a decomposed residual component of a respective operational monitoring timeseries trend is outlier relative to an expected/observed profile for decomposed residual component of a normal/non-outlier operational monitoring timeseries trend. In some embodiments, to generate the inferred outlier score for a respective operational monitoring timeseries trend, the following operations are performed: (i) the respective operational monitoring timeseries trend is processed using a timeseries decomposition routine (e.g., a Seasonal and Trend Decomposition (STL) routine) to generate the decomposed residual component of the respective operational monitoring timeseries trend (e.g., by removing, from the respective operational monitoring timeseries trend, a decomposed trend component of the respective operational monitoring timeseries trend and a decomposed seasonality component of the respective operational monitoring timeseries trend), and (ii) the decomposed operational monitoring timeseries trend for the respective operational monitoring timeseries trend is processed using an outlier detection routine (e.g., a normal-distribution-based univariate-data single-outlier detection routine, such as an extreme studentized deviate (ESD) test or other adjusted Grubbs's-test-based routine) to generate the inferred outlier score (e.g., an extreme studentized deviate score) for the respective operational monitoring timeseries trend. In some embodiments, the inferred outlier score for a respective operational monitoring timeseries trend is an extreme studentized deviate score for the respective operational monitoring timeseries trend. An operational example of generating the decomposed seasonality component 903 for the operational monitoring timeseries trend 600 of FIG. 6 is depicted in FIG. 9. As depicted in FIG. 9, the decomposed seasonality component 903 for the operational monitoring timeseries trend 600 is generated by removing, from the operational monitoring timeseries trend 600, the decomposed trend component 901 of the operational monitoring timeseries trend 600 and the decomposed seasonality component 902 of the operational monitoring timeseries trend 600.

In some embodiments, the predictive data analysis computing entity 106 performs one or more timeseries processing operations on each operational timeseries trend to detect at least one of a trend component of the operational timeseries trend, a seasonality component of the operational timeseries trend, and a residual component of the operational timeseries trend. In some embodiments, the predictive data analysis computing entity 106 aggregates the residual components of the operational timeseries trend in order to generate the one or more residual components of the operational timeseries trend. An example of a timeseries processing operation that may be performed on an operational timeseries trend as described herein is a timeseries decomposition operation such as a Seasonal and Trend Decomposition (STL) operation. In some embodiments, the predictive data analysis computing entity 106 determines, based at least in part on the one or more residual components, one or more positive periods that are deemed to be associated with anomalous operational periods for the monitored computing system. In some embodiments, a positive period is any period whose operational timeseries trend exhibits abnormal/unexpected operational trends after adjusting for seasonality and trend components of the operational timeseries trend. Accordingly, in some embodiments, the predictive data analysis computing entity 106 can use the residual components to identify various periods that are deemed to be associated with anomalous operational states for the monitored computer system. The positive periods can then be used to generate training data that is used for training an anomalous operational state detection machine learning model, as further described below.

In some embodiments, a ground-truth validation criterion is defined based at least in part on whether a given operational monitoring timeseries trend is associated with a threshold number of anomalous condition reporting tickets (e.g., remedy tickets, such as user-generated remedy tickets using an anomalous condition reporting platform for a monitored computer system). For example, in some embodiments, a ground-truth validation criterion instructs that a given operational monitoring timeseries trend should be classified as a positive operational monitoring timeseries trend if the number of anomalous condition reporting tickets for a monitoring period that is associated with the given operational monitoring timeseries trend satisfies (e.g., exceeds) a threshold number of anomalous condition reporting condition tickets, and that the given operational monitoring timeseries trend should be classified as a negative operational monitoring timeseries trend if the number of anomalous condition reporting tickets for the monitoring period that is associated with the given operational monitoring timeseries trend fails to satisfy (e.g., exceed) the threshold number of anomalous condition reporting condition tickets. In some embodiments, the threshold for the number of anomalous condition reporting tickets is determined based at least in part on a static anomalous condition reporting ticket count threshold value and/or a dynamic anomalous condition reporting ticket count threshold value that is determined based at least in part on a distribution of anomalous condition reporting ticket count across all historical monitoring periods for the monitored computer system and/or a set of historical monitoring periods for the monitored computer system that satisfy one or more recency criteria.

In some embodiments, a ground-truth validation criterion is defined based at least in part on both an inferred outlier score for a decomposed residual component of a given operational monitoring timeseries trend and whether the given operational monitoring timeseries trend is associated with a threshold number of anomalous condition reporting tickets. For example, in some embodiments, a ground-truth validation criterion instructs that a given operational monitoring timeseries trend should be classified as a positive operational monitoring timeseries trend if both the inferred outlier score for the decomposed residual component of the given operational monitoring timeseries trend satisfies an inferred outlier score threshold and the respective monitoring period for the given operational monitoring timeseries trend is associated with a threshold number of anomalous condition, but otherwise the given operational monitoring timeseries trend should be classified as a negative operational monitoring timeseries trend. As another example, in some embodiments, a ground-truth validation criterion instructs that a given operational monitoring timeseries trend should be classified as a positive operational monitoring timeseries trend if either the inferred outlier score for the decomposed residual component of the given operational monitoring timeseries trend satisfies an inferred outlier score threshold, the respective monitoring period for the given operational monitoring timeseries trend is associated with a threshold number of anomalous condition, or both, but otherwise the given operational monitoring timeseries trend should be classified as a negative operational monitoring timeseries trend.

In some embodiments, the ground-truth validation criteria can be used to determine not just whether a given operational monitoring timeseries trend is a positive operational monitoring timeseries trend, but also the "positivity level" of the given operational monitoring timeseries trend. For example, in some embodiments: (i) if both the inferred outlier score for the decomposed residual component of the given operational monitoring timeseries trend satisfies an inferred outlier score threshold and the respective monitoring period for the given operational monitoring timeseries trend is associated with a threshold number of anomalous condition, the given operational monitoring timeseries trend is classified as a "high" positive operational monitoring timeseries trend, (ii) if either the inferred outlier score for the decomposed residual component of the given operational monitoring timeseries trend satisfies the inferred outlier score threshold or the respective monitoring period for the given operational monitoring timeseries trend is associated with the threshold number of anomalous condition, but not both, the given operational monitoring timeseries trend is classified as a "low" positive operational monitoring timeseries trend, and (iii) if neither the inferred outlier score for the decomposed residual component of the given operational monitoring timeseries trend satisfies the inferred outlier score threshold nor the respective monitoring period for the given operational monitoring timeseries trend is associated with the threshold number of anomalous condition, the given operational monitoring timeseries trend is classified as a negative operational monitoring timeseries trend.

In some embodiments, for a given operational monitoring timeseries trend that is associated with a respective inferred outlier score and a respective anomalous condition reporting ticket count: (i) if the inferred outlier score satisfies a highest inferred outlier score threshold and the respective anomalous condition reporting ticket count satisfies a highest anomalous condition reporting ticket threshold, then the given operational monitoring timeseries trend is classified as a highest-level operational monitoring timeseries trend, (ii) if either the inferred outlier score satisfies the highest inferred outlier score threshold or the respective anomalous condition reporting ticket count satisfies the highest anomalous condition reporting ticket threshold, but not both, then the given operational monitoring timeseries trend is classified as a second-highest-level operational monitoring timeseries trend, (iii) if both the inferred outlier score satisfies a second-highest inferred outlier score threshold and the respective anomalous condition reporting ticket count satisfies a second-highest anomalous condition reporting ticket threshold, then the given operational monitoring timeseries trend is classified as a third-highest-level operational monitoring timeseries trend, (iv) if either the inferred outlier score satisfies the second-highest inferred outlier score threshold or the respective anomalous condition reporting ticket count satisfies the second-highest anomalous condition reporting ticket threshold, but not both, then the given operational monitoring timeseries trend is classified as a fourth-highest-level operational monitoring timeseries trend, and (v) if neither inferred outlier score nor the anomalous condition reporting ticket count satisfies any of the defined thresholds, the given operational monitoring timeseries trend is classified as a negative operational monitoring timeseries trend.

Returning to FIG. 8, at step/operation 803, the predictive data analysis computing entity 106 determines a negative subset of the corpus of operational monitoring timeseries trends that comprises each operational monitoring timeseries trend that is determined to be a negative operational monitoring timeseries trend. A negative operational monitoring timeseries trend may be an operational monitoring timeseries trend that is associated with a respective monitoring period that is determined to be a non-anomalous/normal activity period for a respective computer system as determined based at least in part on one or more ground-truth validation criteria. In some embodiments, a ground-truth validation criterion describes a defined condition that, if satisfied by the feature data associated with a particular operational monitoring timeseries trend, causes a proposed system to classify the particular operational monitoring timeseries trend as a positive operational monitoring timeseries trend. In some embodiments, when a particular operational monitoring timeseries trend fails to satisfy any of the defined ground-truth validation criteria, then the particular operational monitoring timeseries trend is classified as a negative operational monitoring timeseries trend.

In some embodiments, the predictive data analysis computing entity 106 determines, based at least in part on the one or more residual components, one or more negative periods that are deemed to be associated with non-anomalous/normal operational periods for the software application framework. In some embodiments, a negative period is any period whose operational timeseries trend exhibits normal/expected operational trends after adjusting for seasonality and trend components of the operational timeseries trend. Accordingly, the predictive data analysis computing entity 106 can use the trend components in order to identify various periods that are deemed to be associated with non-non-anomalous/normal operational states for the software application framework. The negative periods can then be used to generate training data that is used for training an anomalous operational state detection machine learning model, as further described below.

At step/operation 804, the predictive data analysis computing entity 106 generates a set of positive training entries based at least in part on the positive subset of the corpus of operational monitoring timeseries trend. In some embodiments, each positive operational monitoring timeseries trend in the positive subset is used to generate a corresponding positive training entry that comprises: (i) as input training data, one or more input features generated in accordance with the input space of the anomalous operational state detection machine learning model (e.g., one or more statistical features of the positive operational monitoring timeseries trend, a time-of-day category designator for the monitoring period that is associated with the positive operational monitoring timeseries trend, a day-of-week category designator for the monitoring period that is associated with positive operational monitoring timeseries trend, an affected/suboptimal system component during the monitoring period that is associated with the positive operational monitoring timeseries trend, a count of anomalous condition reporting tickets that are generated during the monitoring period that is associated with the positive operational monitoring timeseries trend, and/or the like), and (ii) as ground-truth output data, a ground-truth anomaly classification score that describes at least one of the determination that the positive operational monitoring timeseries trend is indeed a positive operational monitoring timeseries trend or a determined positivity level of the positive operational monitoring timeseries trend.

For example, in some embodiments, each positive operational monitoring timeseries trend in the positive subset is given a predetermined ground-truth anomaly classification score, such as a ground-truth anomaly classification score of 1.0. As another example, in some embodiments, each positive operational monitoring timeseries trend in the positive subset is given a non-minimal (e.g., non-zero positive) ground-truth anomaly classification score that is assigned to the respective positivity level of the positive operational monitoring timeseries trend, such that the higher the positivity level of a given positive operational monitoring timeseries trend, the higher the ground-truth anomaly detection score of the given positive operational monitoring timeseries trend. In an exemplary embodiment, the positive training entry for a given highest-level positive operational monitoring timeseries trend is given a ground-truth anomaly score of 1.0, the positive training entry for a given second-highest-level positive operational monitoring timeseries trend is given a ground-truth anomaly score of 0.8, the positive training entry for a given third-highest-level positive operational monitoring timeseries trend is given a ground-truth anomaly score of 0.6, the positive training entry for a given fourth-highest-level positive operational monitoring timeseries trend is given a ground-truth anomaly score of 0.4, and so on.

At step/operation 805, the predictive data analysis computing entity 106 generates a set of negative training entries based at least in part on the negative subset of the corpus of operational monitoring timeseries trend. In some embodiments, each negative operational monitoring timeseries trend in the negative subset is used to generate a corresponding negative training entry that comprises: (i) as input training data, one or more input features generated in accordance with the input space of the anomalous operational state detection machine learning model (e.g., one or more statistical features of the negative operational monitoring timeseries trend, a time-of-day category designator for the monitoring period that is associated with the negative operational monitoring timeseries trend, a day-of-week category designator for the monitoring period that is associated with negative operational monitoring timeseries trend, an affected/suboptimal system component during the monitoring period that is associated with the negative operational monitoring timeseries trend, a count of anomalous condition reporting tickets that are generated during the monitoring period that is associated with the negative operational monitoring timeseries trend, and/or the like), and (ii) as ground-truth output data, a ground-truth anomaly classification score that describes that the negative operational monitoring timeseries trend is indeed a negative operational monitoring timeseries trend. For example, in some embodiments, each negative operational monitoring timeseries trend in the negative subset is given a predetermined ground-truth anomaly classification score, such as a ground-truth anomaly classification score of zero.

At step/operation 806, the predictive data analysis computing entity 106 generates/trains the anomalous operational state detection machine learning model based at least in part on training data comprising the set of positive training entries and the set of negative training entries. In some embodiments, the anomalous operational state detection machine learning model is trained based at least in part on a measure of deviation for a set of training entries, where the measure of deviation for a set of n training entries is determined based at least in part on a difference measure for each of the n training entries, where each difference measure for a training entry is determined based at least in part on a difference of the ground-truth anomaly indicator for the training entry and an inferred anomaly classification score for the training entry that is determined based at least in part on an output of processing the set of training input features for the training entry using the anomalous operational state detection machine learning model during the training of the anomalous operational state detection machine learning model. In some embodiments, the anomalous operational state detection machine learning model is trained by optimizing the measure of deviation, e.g., using a gradient descent optimization routine. In some embodiments, the training data includes a set of training entries, where: (i) each training entry is associated with a set of training input features and a ground-truth anomaly indicator, and (ii) the set of training entries include a set of positive training entries and a set of positive training entries. In some embodiments, each positive training entry is associated with a ground-truth anomaly indicator describing that the positive training entry describes that a corresponding period for the positive training entry is a positive/anomalous period. In some embodiments, each negative training entry is associated with a ground-truth anomaly indicator describing that the negative training entry describes that a corresponding period for the negative training entry is a negative/non-anomalous/normal period. In some embodiments, the set of training input features for a positive training entry is determined based at least in part on the timeseries trend data and/or other operational data (e.g., time-of-day data, affected system component data, and/or the like) for the positive time period that is associated with the positive training entry. In some embodiments, the set of training input features for a negative training entry is determined based at least in part on the timeseries trend data and/or other operational data (e.g., time-of-day data, affected system component data, and/or the like) for the negative time period that is associated with the negative training entry. In some embodiments, each set of input features for a training entry is determined based at least in part on extracting a set of features defined by an expected input format of the anomalous operational state detection machine learning model from a period that is associated with the noted training entry.

Accordingly, by using the process 800 of FIG. 8, various embodiments of the present invention improve computational efficiency of performing reliable persistent monitoring of a computer system. Persistent monitoring of the operations of a computer system has various operational reliability benefits for various computer systems and is an important part of service level objectives for highly maintenance-critical computer systems. However, doing the noted persistent monitoring operations in a reliable manner requires access to large amounts of labeled training data that are not always available for more customized computer systems with unique operational/behaviorial pattern signatures. In response, various embodiments of the present invention address the noted challenges by generating training data for an anomalous operational state detection machine learning model whose training data may be generated using a ground-truth validation criterion that is defined based at least in part on an inferred outlier score for a decomposed residual component of a given operational monitoring timeseries trend. In doing so, the noted embodiments of the present invention enable generating training data for a model that is configured to persistently and reliably predict anomalous conditions of a monitored computer system in an automated and efficient manner using computationally simple time-series processing operations. Accordingly, various embodiments of the present invention improve computational efficiency of performing reliable persistent monitoring of a computer system by enabling automated and reliable generation of training data for an anomalous operational state detection machine learning model.

Returning to FIG. 5, at step/operation 506, the predictive data analysis computing entity 106 performs one or more prediction-based actions based at least in part on the inferred anomaly classification score. In some embodiments, performing the prediction-based actions comprises generating user interface data for a prediction output use interface that displays data describing one or more monitoring periods whose respective operational monitoring timeseries trends have anomalous classification scores that satisfy a threshold. An example of such a prediction output user interface 1000 is provided in FIG. 10.

Various embodiments of the present invention introduce techniques for predictive anomaly detection that are able to efficiently and reliably generate predictive inferences about anomalous periods of complex monitored computer systems by using deep learning techniques. Other examples of prediction-based actions that may be performed in accordance with various embodiments of the present invention include automatic system reboots, automatic system shutdowns, automatic limiting of user access by unprivileged users to designated portions of the software application framework, and/or the like.

In some embodiments, performing the prediction-based actions includes providing an AIOps platform as described herein. In some embodiments, the AIOps platform is configured to ingest performance metrics through a data pipeline, model training, and anomalous behavior predictions. The data is democratized for teams to consume data for future use. In some embodiments, the AIOps platform comprises a validation component that is used to improve the model's capacity for detecting anomalies using positive and negative control data. This data enables testing and validation of the anomaly.

In some embodiments, the AIOps platform provides predictive data to an information technology product and support teams as an indicator that a system or application problem is imminent, and proactively responds to impending issues for any relevant software applications. The data provided gives application teams either the intelligence with the highest degree of confidence about where the root of the issue is or automatically resolves the issue if identified as a low-risk problem.

In some embodiments, the AIOps platform leverages machine learning methods to predict the expected behavior for each of various systems and applications. Based at least in part on historical data collected by the platform, the platform trains models that learn how each resource behaves and make forecasts based at least in part on that. As new data is collected, the platform compares the metric's predictions and the actual data. When abnormal behavior is identified, the platform can either remediate the issue automatically or notify the teams and provide insights to mitigate the problem rapidly.

In some embodiments, to identify anomalies in a software application framework environment, the AIOps platform utilizes predictive models that forecast expected machines' metrics behavior. To create those predictions, the platform applies machine learning methods in an ensemble approach using linear regression and gradient boosting functions. Based at least in part on historical machines' behavior, the machine learning methods can learn the data patterns and forecast machines' performance daily. As the platform creates those forecasts, it compares the real machines' performance values and compares it with the expected values for that specific machine metric. In the cases where the actual values diverge from the forecasts more than an acceptable limit, the platform can flag that datapoint as an anomaly.

Accordingly, as described above, various embodiments of the present invention improve computational efficiency of performing reliable persistent monitoring of a computer system. Persistent monitoring of the operations of a computer system has various operational reliability benefits for various computer systems and is an important part of service level objectives for highly maintenance-critical computer systems. However, doing the noted persistent monitoring operations in a reliable manner requires access to large amounts of labeled training data that are not always available for more customized computer systems with unique operational/behaviorial pattern signatures. In response, various embodiments of the present invention address the noted challenges by generating training data for an anomalous operational state detection machine learning model whose training data may be generated using a ground-truth validation criterion that is defined based at least in part on an inferred outlier score for a decomposed residual component of a given operational monitoring timeseries trend. In doing so, the noted embodiments of the present invention enable generating training data for a model that is configured to persistently and reliably predict anomalous conditions of a monitored computer system in an automated and efficient manner using computationally simple timeseries processing operations. Accordingly, various embodiments of the present invention improve computational efficiency of performing reliable persistent monitoring of a computer system by enabling automated and reliable generation of training data for an anomalous operational state detection machine learning model.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating an inferred anomaly classification score for an input operational monitoring timeseries trend for a monitored computer system during a target monitoring period, the computer-implemented method comprising:
   generating, using one or more processors and an initial anomaly designation machine learning model, and based at least in part on the input operational monitoring timeseries trend, an initial anomaly designation for the input operational monitoring timeseries trend;
   in response to determining that the initial anomaly designation for the input operational monitoring timeseries trend is a positive initial anomaly designation, generating, using the one or more processors and an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and initiating, using the one or more processors, the performance of a prediction-based action based at least in part on the inferred anomaly classification score, wherein the prediction-based action comprises one or more of generating user interface data for an output user interface, instructing a system reboot for the monitored computer system, instructing a system shutdown for the monitored computer system, or limiting user access to the monitored computer system.

2. The computer-implemented method of claim 1, wherein the initial anomaly designation machine learning model is configured to:

identify an operational forecast timeseries trend for the monitored computer system during the target monitoring period, determine a forecast deviation measure for the input operational monitoring timeseries trend based at least in part on the input operational monitoring timeseries trend and the operational forecast timeseries trend, and determine the initial anomaly designation based at least in part on whether a forecasting deviation measure satisfies a forecast deviation measure threshold.

3. The computer-implemented method of claim 2, wherein:

the operational forecast timeseries trend is generated using an operational forecasting machine learning model that is configured to generate the operational forecast timeseries trend based at least in part on a historical operational monitoring timeseries trend for a historical monitoring period, and the target monitoring period is within a forecast period of the historical monitoring period as defined by hyperparameter data for the operational forecasting machine learning model.

4. The computer-implemented method of claim 3, wherein the forecast deviation measure threshold is generated based at least in part on a root mean square error measure of forecasting deviation measures for a corpus of operational monitoring timeseries trends.

5. The computer-implemented method of claim 1, wherein:

the initial anomaly designation machine learning model comprises a recurrent neural network machine learning model that is configured to process the input operational monitoring timeseries trend via a plurality of timesteps, and the initial anomaly designation is generated based at least in part on a final hidden state generated by a final timestep of the plurality of timesteps.

6. The computer-implemented method of claim 1, wherein, in accordance with the first ground-truth validation criterion, the given operational monitoring timeseries trend is detected as being one of the one or more positive operational monitoring timeseries trends in response to determining that the inferred outlier score satisfies an inferred outlier score threshold.

7. The computer-implemented method of claim 1, wherein the inferred outlier score is an extreme studentized deviate score.

8. The computer-implemented method of claim 1, wherein the one or more ground-truth validation criteria comprise a second ground-truth validation criterion that is defined based at least in part on whether a particular operational monitoring timeseries trend is associated with a threshold number of anomalous condition reporting tickets.

9. An apparatus for generating an inferred anomaly classification score for an input operational monitoring timeseries trend for a monitored computer system during a target monitoring period, the apparatus comprising one or more processors and at least one memory including program code, the at least one memory and the program code configured to, with the one or more processors, cause the apparatus to at least:

generate, using an initial anomaly designation machine learning model, and based at least in part on the input operational monitoring timeseries trend, an initial anomaly designation for the input operational monitoring timeseries trend;

in response to determining that the initial anomaly designation for the input operational monitoring timeseries trend is a positive initial anomaly designation, generate, using an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and perform one or more prediction-based actions based at least in part on the inferred anomaly classification score;

initiate the performance of a prediction-based action based at least in part on the inferred anomaly classification score, wherein the prediction-based action comprises one or more of generating user interface data for an output user interface, instructing a system reboot for the monitored computer system, instructing a system shutdown for the monitored computer system, or limiting user access to the monitored computer system.

10. The apparatus of claim 9, wherein the initial anomaly designation machine learning model is configured to:

identify an operational forecast timeseries trend for the monitored computer system during the target monitoring period, determine a forecast deviation measure for the input operational monitoring timeseries trend based at least in part on the input operational monitoring timeseries trend and the operational forecast timeseries trend, and determine the initial anomaly designation based at least in part on whether a forecasting deviation measure satisfies a forecast deviation measure threshold.

11. The apparatus of claim 10, wherein:
the operational forecast timeseries trend is generated using an operational forecasting machine learning model that is configured to generate the operational forecast timeseries trend based at least in part on a historical operational monitoring timeseries trend for a historical monitoring period, and
the target monitoring period is within a forecast period of the historical monitoring period as defined by hyperparameter data for the operational forecasting machine learning model.

12. The apparatus of claim 11, wherein the forecast deviation measure threshold is generated based at least in part on a root mean square error measure of forecasting deviation measures for a corpus of operational monitoring timeseries trends.

13. The apparatus of claim 9, wherein:
the initial anomaly designation machine learning model comprises a recurrent neural network machine learning model that is configured to process the input operational monitoring timeseries trend via a plurality of timesteps, and
the initial anomaly designation is generated based at least in part on a final hidden state generated by a final timestep of the plurality of timesteps.

14. The apparatus of claim 9, wherein, in accordance with the first ground-truth validation criterion, the given operational monitoring timeseries trend is detected as being one of the one or more positive operational monitoring timeseries trends in response to determining that the inferred outlier score satisfies an inferred outlier score threshold.

15. The apparatus of claim 9, wherein the inferred outlier score is an extreme studentized deviate score.

16. The apparatus of claim 9, wherein the one or more ground-truth validation criteria comprise a second ground-truth validation criterion that is defined based at least in part on whether a particular operational monitoring timeseries trend is associated with a threshold number of anomalous condition reporting tickets.

17. A computer program product for generating an inferred anomaly classification score for an input operational monitoring timeseries trend for a monitored computer system during a target monitoring period, the computer program product comprising at least one non-transitory computer-readable storage medium having computer-readable program code portions stored therein, the computer-readable program code portions configured to:
generate, using an initial anomaly designation machine learning model, and based at least in part on the input operational monitoring timeseries trend, an initial anomaly designation for the input operational monitoring timeseries trend;
in response to determining that the initial anomaly designation for the input operational monitoring timeseries trend is a positive initial anomaly designation, generate, using an anomalous operational state detection machine learning model, and based at least in part on the input operational monitoring timeseries trend, the inferred anomaly classification score for the input operational monitoring timeseries trend, wherein: (i) the anomalous operational state detection machine learning model is trained using one or more positive training entries corresponding to one or more positive operational monitoring timeseries trends and one or more negative training entries corresponding to one or more negative operational monitoring timeseries trends, (ii) each positive operational monitoring timeseries trend is detected in accordance with one or more ground-truth validation criteria, and (iii) the one or more ground-truth validation criteria comprise a first ground-truth validation criterion that is defined based at least in part on an inferred outlier score for a decomposed residual component of a given operational monitoring timeseries trend; and
initiate the performance of a prediction-based action based at least in part on the inferred anomaly classification score, wherein the prediction-based action comprises one or more of generating user interface data for an output user interface, instructing a system reboot for the monitored computer system, instructing a system shutdown for the monitored computer system, or limiting user access to the monitored computer system.

18. The computer program product of claim 17, wherein the initial anomaly designation machine learning model is configured to:
identify an operational forecast timeseries trend for the monitored computer system during the target monitoring period,
determine a forecast deviation measure for the input operational monitoring timeseries trend based at least in part on the input operational monitoring timeseries trend and the operational forecast timeseries trend, and
determine the initial anomaly designation based at least in part on whether a forecasting deviation measure satisfies a forecast deviation measure threshold.

19. The computer program product of claim 18, wherein:
the operational forecast timeseries trend is generated using an operational forecasting machine learning model that is configured to generate the operational forecast timeseries trend based at least in part on a historical operational monitoring timeseries trend for a historical monitoring period, and
the target monitoring period is within a forecast period of the historical monitoring period as defined by hyperparameter data for the operational forecasting machine learning model.

20. The computer program product of claim 19, wherein the forecast deviation measure threshold is generated based at least in part on a root mean square error measure of forecasting deviation measures for a corpus of operational monitoring timeseries trends.

* * * * *